United States Patent
Kobayashi et al.

(10) Patent No.: US 9,407,428 B2
(45) Date of Patent: Aug. 2, 2016

(54) RECEPTION APPARATUS, RECEPTION METHOD, AND PROGRAM

(71) Applicant: Sony Corporation, Tokyo (JP)

(72) Inventors: Kenichi Kobayashi, Tokyo (JP); Naoto Nagaki, Tokyo (JP); Hiroyuki Kamata, Kanagawa (JP); Satoshi Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/498,050

(22) Filed: Sep. 26, 2014

(65) Prior Publication Data

US 2015/0117581 A1 Apr. 30, 2015

(30) Foreign Application Priority Data

Oct. 28, 2013 (JP) ................................. 2013-222910

(51) Int. Cl.
*H04L 7/02* (2006.01)
*H04L 27/26* (2006.01)

(52) U.S. Cl.
CPC .............. *H04L 7/02* (2013.01); *H04L 27/2662* (2013.01); *H04L 27/2672* (2013.01); *H04L 27/2678* (2013.01); *H04L 27/2685* (2013.01)

(58) Field of Classification Search
CPC .................. H04L 27/2675; H04L 27/2662
See application file for complete search history.

(56) References Cited

U.S. PATENT DOCUMENTS

| | | | | |
|---|---|---|---|---|
| 2006/0064725 | A1* | 3/2006 | Rabinowitz et al. | 725/68 |
| 2009/0092197 | A1* | 4/2009 | Okamoto et al. | 375/260 |
| 2009/0213943 | A1* | 8/2009 | Gu et al. | 375/260 |
| 2011/0164671 | A1* | 7/2011 | Matsumura | 375/229 |
| 2013/0259487 | A1* | 10/2013 | Sakamoto | H04B 10/6165 398/135 |
| 2013/0265956 | A1* | 10/2013 | Mourad et al. | 370/329 |

FOREIGN PATENT DOCUMENTS

JP 2013-156162 8/2013

* cited by examiner

*Primary Examiner* — Ross Varndell
(74) *Attorney, Agent, or Firm* — Michael Best & Friedrich LLP

(57) ABSTRACT

Provided is a reception apparatus including: a correction unit that corrects phase compensation for each one of multiple phase-compensated segments that are connected one after another, in which the correction unit includes a timing generation unit that, based on a phase of a known signal, generates a timing at which an amount of the phase compensation is initialized, an amount-of-correction generation unit that, based on the phase of the known signal, generates an amount of correction for correcting the amount of the phase compensation, and a phase correction unit that performs phase correction on the phase compensation using the amount of the correction that is generated by the amount-of-correction generation unit.

11 Claims, 12 Drawing Sheets

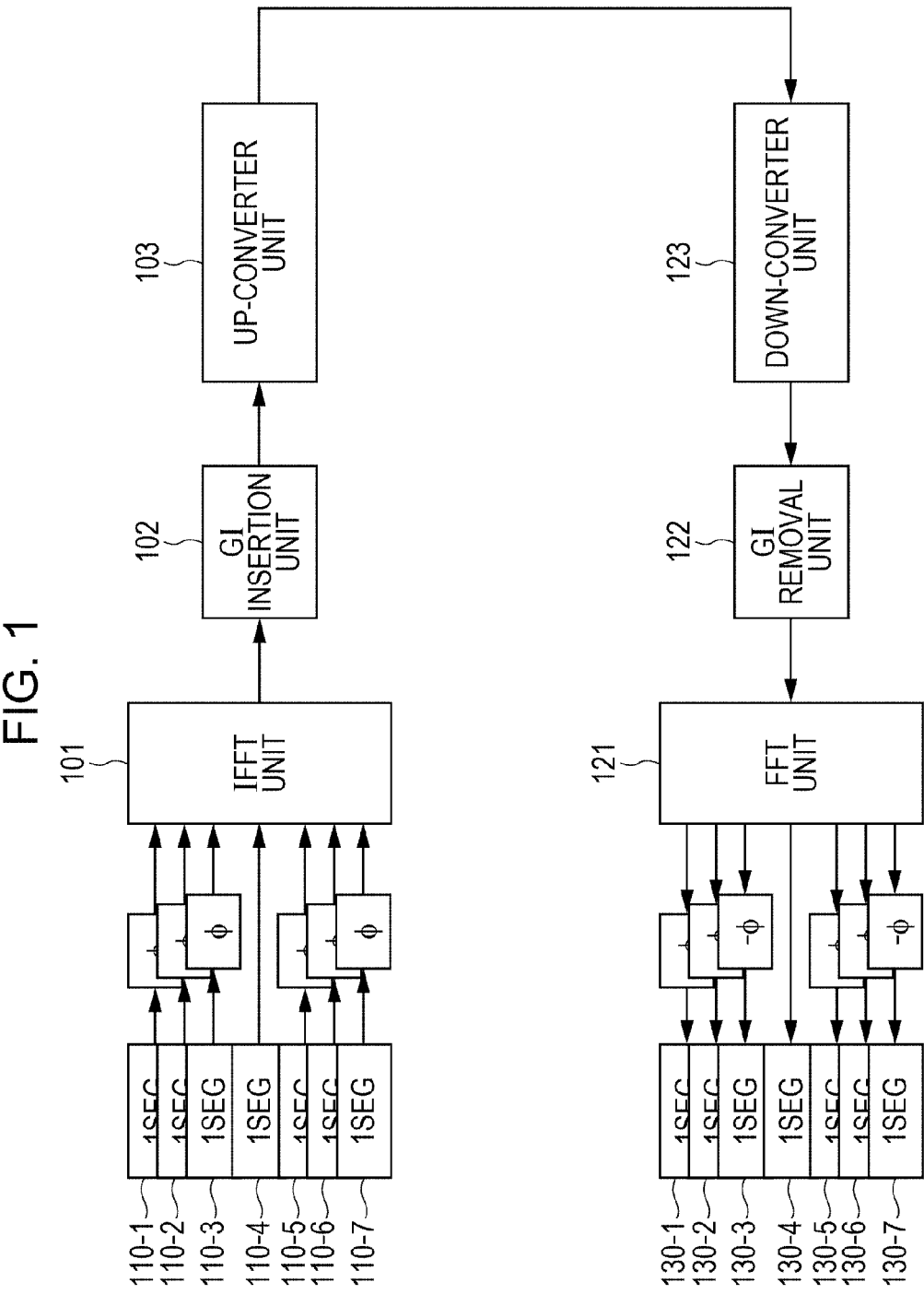

FIG. 3

AMOUNT OF TRANSMISSION-SIDE PHASE COMPENSATION FOR EVERY SYMBOL $\phi$ ($\times 2\pi$)
DIFFERENCE IN CENTER FREQUENCY $\Delta f$ (fr - ft)

| MODE | GUARD INTERVAL RATIO | +n | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|
| 1 | 1/32 | Mod(3n, 8)/8 | 0 | 3/8 | 3/4 | 1/8 | 1/2 | 7/8 | 1/4 | 5/8 | 0 | 3/8 | 3/4 | 1/8 | 1/2 | 7/8 | 1/4 | 5/8 | 0 |
| 1 | 1/16 | Mod(3n, 4)/4 | 0 | 3/4 | 1/2 | 1/4 | 0 | 3/4 | 1/2 | 1/4 | 0 | 3/4 | 1/2 | 1/4 | 0 | 3/4 | 1/2 | 1/4 | 0 |
| 1 | 1/8 | Mod(n, 2)/2 | 0 | 1/2 | 0 | 1/2 | 0 | 1/2 | 0 | 1/2 | 0 | 1/2 | 0 | 1/2 | 0 | 1/2 | 0 | 1/2 | 0 |
| 1 | 1/4 | 0 | 0 | 0 | 0 | 0 | 0 | 0 | 0 | 0 | 0 | 0 | 0 | 0 | 0 | 0 | 0 | 0 | 0 |
| 2 | 1/32 | Mod(3n, 4)/4 | 0 | 3/4 | 1/2 | 1/4 | 0 | 3/4 | 1/2 | 1/4 | 0 | 3/4 | 1/2 | 1/4 | 0 | 3/4 | 1/2 | 1/4 | 0 |
| 2 | 1/16 | Mod(n, 2)/2 | 0 | 1/2 | 0 | 1/2 | 0 | 1/2 | 0 | 1/2 | 0 | 1/2 | 0 | 1/2 | 0 | 1/2 | 0 | 1/2 | 0 |
| 2 | 1/8 | 0 | 0 | 0 | 0 | 0 | 0 | 0 | 0 | 0 | 0 | 0 | 0 | 0 | 0 | 0 | 0 | 0 | 0 |
| 2 | 1/4 | 0 | 0 | 0 | 0 | 0 | 0 | 0 | 0 | 0 | 0 | 0 | 0 | 0 | 0 | 0 | 0 | 0 | 0 |
| 3 | 1/32 | Mod(n, 2)/2 | 0 | 1/2 | 0 | 1/2 | 0 | 1/2 | 0 | 1/2 | 0 | 1/2 | 0 | 1/2 | 0 | 1/2 | 0 | 1/2 | 0 |
| 3 | 1/16 | 0 | 0 | 0 | 0 | 0 | 0 | 0 | 0 | 0 | 0 | 0 | 0 | 0 | 0 | 0 | 0 | 0 | 0 |
| 3 | 1/8 | 0 | 0 | 0 | 0 | 0 | 0 | 0 | 0 | 0 | 0 | 0 | 0 | 0 | 0 | 0 | 0 | 0 | 0 |
| 3 | 1/4 | 0 | 0 | 0 | 0 | 0 | 0 | 0 | 0 | 0 | 0 | 0 | 0 | 0 | 0 | 0 | 0 | 0 | 0 |

FIG. 4

(UNIT) SYMBOL PERIOD

|        | GI32 | GI16 | GI8 | GI4 |
|--------|------|------|-----|-----|
| MODE 1 | 8    | 4    | 2   | —   |
| MODE 2 | 4    | 2    | —   | —   |
| MODE 3 | 2    | —    | —   | —   |

FIG. 8

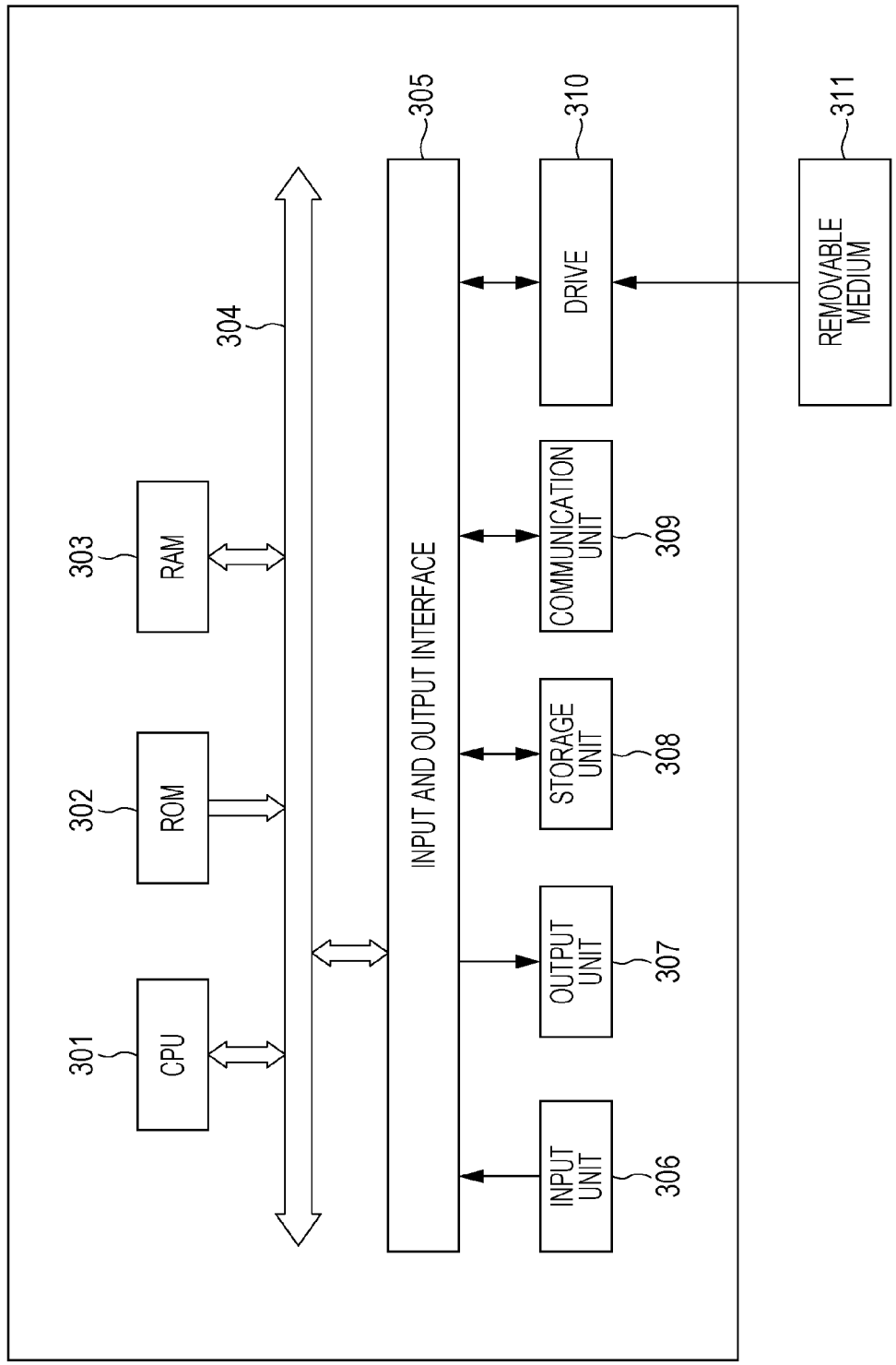

RECEPTION APPARATUS, RECEPTION METHOD, AND PROGRAM

CROSS REFERENCE TO RELATED APPLICATIONS

This application claims the benefit of Japanese Priority Patent Application JP 2013-222910 filed Oct. 28, 2013, the entire contents of which are incorporated herein by reference.

BACKGROUND

The present technology relates to a reception apparatus, a reception method, and a program, and more particularly to a reception apparatus for, a reception method for, and a program for shortening the time relating to processing when receiving and processing multiple segments.

Broadcasting reception apparatuses have been used that are capable of receiving program broadcasting such as terrestrial digital broadcasting, cable television broadcasting, or satellite broadcasting. Furthermore, mobile multimedia broadcasting also has been started that is a type of integrated services digital broadcasting for terrestrial multimedia broadcasting (ISDB-Tmm).

In the ISDB-Tmm, a frequency band (VHF band from 207.5 MHz to 222 MHz) that is allocated to the terrestrial multimedia broadcasting is configured from 33 segments. At this time, signals in the 33 segments are connected and are transmitted, as segment-connected transmission signals, by a broadcasting transmission station without the 33 segments being separated from one another by a guard band.

Furthermore, arranged within the 33 segments are two super segments in a 13-segment format called a type-A super segment and super segments in a one-segment format called a type-B super segment (for example, refer to Japanese Unexamined Patent Application Publication No. 2013-156162).

SUMMARY

When multiple segments are connected one after another and are transmitted, phase compensation is performed on a difference between center frequencies. At the receiving side, processing that corrects phase compensation for each one of the segments that are connection-transmitted is performed. There is a method in which when setting an initialization timing for the correction, an amount of phase rotation is set to 0 in a head symbol in the frame, whose synchronization word for transmission multiplexing configuration control (TMCC) is w0.

However, when the initialization timing is set based on TMCC information, because the TMCC information has to be decoded to investigate a synchronization word of the head symbol in the frame, and furthermore, because information for at least one frame is necessary for decoding for the TMCC, there is a likelihood that time will be taken before starting the initialization. At this point, it is desirable to shorten the time taken before the initialization.

It is desirable to shorten the time taken before initialization when processing multiple segments.

According to an embodiment of the present technology, there is provided a first reception apparatus including a correction unit that corrects phase compensation for each one of multiple phase-compensated segments that are connected one after another, in which the correction unit includes a timing generation unit that, based on a phase of a known signal, generates a timing at which an amount of the phase compensation is initialized, an amount-of-correction generation unit that, based on the phase of the known signal, generates an amount of correction for correcting the amount of the phase compensation, and a phase correction unit that performs phase correction on the phase compensation using the amount of the correction that is generated by the amount-of-correction generation unit.

The phase of the known signal may have multiple patterns, and the timing generation unit may generate the timing at which the initialization occurs when among the multiple patterns, a predetermined pattern is detected.

The known signal may be a pilot signal, and the pattern may be categorized by a position in which a scattered pilot (SP) is arranged.

The amount of the phase compensation may be 0 for every predetermined period, and the timing generation unit may detect the timing at which the amount of the phase compensation is 0, by detecting the predetermined pattern.

The predetermined period for the amount of the phase compensation may vary with transmission parameters, and by detecting the predetermined pattern, the timing generation unit may detect the timing at which the amount of the phase compensation is 0 with the predetermined period that is specified by the transmission parameters.

The parameters may be a mode and a guard interval ratio.

The segments being connected one after another may be segments that are connected one after another in accordance with ISDB-Tmm or ISDB-Tsb specifications.

The segments being connected one after another may be type-B super segments in accordance with ISDB-Tmm or ISDB-Tsb specifications.

According to an embodiment of the present technology, there is provided a first reception method for use in a reception apparatus including a correction unit that corrects phase compensation for each one of multiple phase-compensated segments that are connected one after another, the method including: enabling the correction unit to generate a timing at which an amount of the phase compensation is initialized, based on a phase of a known signal; enabling the correction unit to generate an amount of correction for correcting the amount of the phase compensation, based on the phase of the known signal; and enabling the correction unit to perform phase correction on the phase compensation using the generated amount of the correction.

According to an embodiment of the present technology, there is provided a first computer-readable program for causing a computer, which controls a reception apparatus which includes a correction unit that corrects phase compensation for each one of multiple phase-compensated segments that are connected one after another, to enable the correction unit to execute processing including: generating a timing at which an amount of the phase compensation is initialized, based on a phase of a known signal; generating an amount of correction for correcting the amount of the phase compensation, based on the phase of the known signal; and performing phase correction on the phase compensation using the generated amount of the correction.

In the first reception apparatus, the first reception method, and the first program according to the embodiment of the present technology, the provided correction unit, which corrects the phase compensation for each one of the multiple phase-compensated segments that are connected one after another, generates the timing at which the amount of the phase compensation is initialized, based on the phase of the known signal, generates the amount of correction for correcting the amount of the phase compensation, based on the phase of the known signal, and performs the phase correction on the phase compensation using the generated amount of the correction.

According to an embodiment of the present technology, there is provided a second reception apparatus including a correction unit that corrects phase compensation for each one of multiple phase-compensated segments that are connected one after another, in which the correction unit includes an amount-of-correction generation unit that, based on a phase of a known signal, generates an amount of correction for correcting an amount of the phase compensation, and a phase correction unit that performs phase correction on the phase compensation using the amount of the correction that is generated by the amount-of-correction generation unit.

According to an embodiment of the present technology, there is provided a second reception method for use in a reception apparatus including a correction unit that corrects phase compensation for each one of multiple phase-compensated segments that are connected one after another, the method including: enabling the correction unit to generate an amount of correction for correcting an amount of the phase compensation, based on a phase of a known signal; and enabling the correction unit to perform phase correction on the phase compensation using the generated amount of the correction.

According to an embodiment of the present technology, there is provided a second computer-readable program for causing a computer, which controls a reception apparatus which includes a correction unit that corrects phase compensation for each one of multiple phase-compensated segments that are connected one after another, to enable the correction unit to execute processing including: generating an amount of correction for correcting an amount of the phase compensation, based on a phase of a known signal; and performing phase correction on the phase compensation using the generated amount of the correction.

In the second reception apparatus, the second reception method, and the second program according to the embodiment of the present technology, the provided correction unit, which corrects the phase compensation for each one of the multiple phase-compensated segments that are connected one after another, generates the amount of correction for correcting the amount of the phase compensation, based on the phase of the known signal, and performs the phase correction on the phase compensation using the generated amount of the correction.

According to the embodiment of the present technology, when multiple segments are processed, the time taken before the initialization can be shortened.

Moreover, a limitation to this effect is not imposed, and any effects that are described in the present disclosure may be possible.

BRIEF DESCRIPTION OF THE DRAWINGS

FIG. 1 is a diagram illustrating a configuration of a transmission and reception system according to one embodiment, which includes a reception apparatus to which the present technology applies;

FIG. 3 is a diagram for describing phase compensation;

FIG. 4 is a table in which periods for the phase compensation are summarized;

FIG. 8 is a diagram for describing operation of the setting unit;

FIG. 12 is a diagram for describing a recording medium.

DETAILED DESCRIPTION OF EMBODIMENTS

Figure 2A:
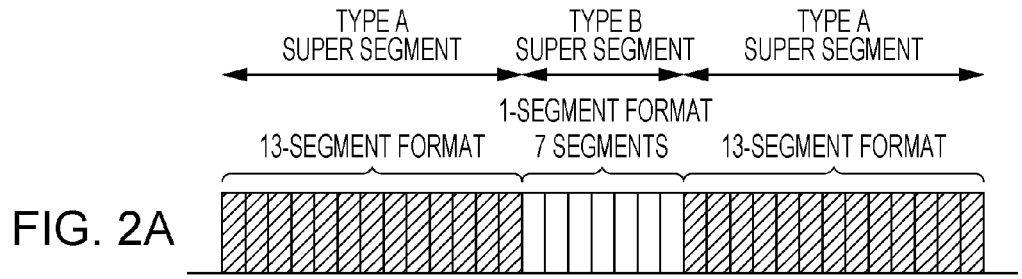
FIGS. 2A to 2C are diagrams illustrating a configuration of segments that are transmitted and received.

Embodiments according to the present technology (hereinafter referred to as embodiments) are described below. Moreover, the order in which descriptions are provided is as follows.

1. Configurations of a Transmission Apparatus and a Reception Apparatus
2. Setting of Initialization Timing
3. Configuration of a Setting Unit
4. Operation of the Setting Unit
5. Processing Associated with Setting of Initialization Timing
6. Configuration of and Processing by the Setting Unit Associated with Setting Other Than the Initialization Timing
7. Recording Medium Configurations of a Transmission Apparatus and a Reception Apparatus A technology that is described below can be applied to a reception apparatus that receives and processes multiple segments. Because of this, the technology is described with such reception apparatus as an example. FIG. 1 is a diagram illustrating a configuration of a transmission and reception system according one embodiment, which includes the reception apparatus to which the present technology applies. FIG. 1 is a diagram illustrating only components necessary for descriptions provided below. Thus, the transmission and reception system is simple in configuration as illustrated in FIG. 1.

The transmission and reception system illustrated in FIG. 1 transmits multiple segments at the same timing, and receives and processes the transmitted multiple segments. At this point, a description continues with an example in which 7 segments are transmitted, and are received and processed. Furthermore, the 7 segments are set to be connected one after another and be transmitted, and this is suitably described as connection transmission. Furthermore, the reception and processing of the 7 segments that are transmitted with the connection transmission are suitably described as connection reception.

The 7 segments, as illustrated below referring to FIGS. 2A to 2C, can be segments, called type-B super segments that are transmitted and received in Integrated Services Digital Broadcasting for Terrestrial Multimedia Broadcasting (ISDB-Tmm). For this reason, at this point, the description is provided with the 7 segments as an example.

In the transmission and reception system in FIG. 1, a component corresponding to the transmission apparatus includes an inverse fast Fourier transform (IFFT) unit 101, a guard interval (GI) insertion unit 102, and an up-converter unit 103, and a component corresponding to the reception apparatus includes a fast Fourier transform (FFT) unit 121, a GI removal unit 122, and a down-converter unit 123.

Segments 110-1 to 110-7 that are connection-transmitted are input into the IFFT unit 101. Each one of the segments 110-1 to 110-7 is one segment (1 segment). When the segments are connected one after another and are defined as a connected OFDM segment, phase compensation and the like are performed on a difference between center frequencies. Then, after such phase compensation is performed, the segments are input into the IFFT unit 101.

In the IFFT unit 101, the connected OFDM segment is converted by an IFFT arithmetic operation into an OFDM signal, and in the GI insertion unit 102, is converted into an OFDM transmission signal to which a guard interval is added. Then, the OFDM transmission signal is converted into a digital broadcasting transmission signal in a frequency that is determined in the up-converter unit 103, and, after being amplified with an amplifier not illustrated and the like, is transmitted with an antenna.

The signal that is transmitted from the transmitting side is received by an antenna not illustrated at the receiving side, and is supplied to the down-converter unit 123. The signal is frequency-converted into a frequency that is handled at the receiving side by the down-converter unit 123, and then the guard interval is removed by the GI removal unit 122 from the signal.

The FFT unit 121 performs an arithmetic operation on the OFDM signal and extracts the connected OFDM segments. Processing such as phase compensation is performed on each segment of the connected OFDM segments and thus, in this case, the 7 segments (symbols) are obtained.

At this point, the connected OFDM segment that is transmitted and received is described in addition. In the ISDB-Tmm, it is stipulated that the segments configured as illustrated in FIGS. 2A to 2C are transmitted and received, and the phase compensation as illustrated in FIG. 3 is stipulated.

Figure 2B:
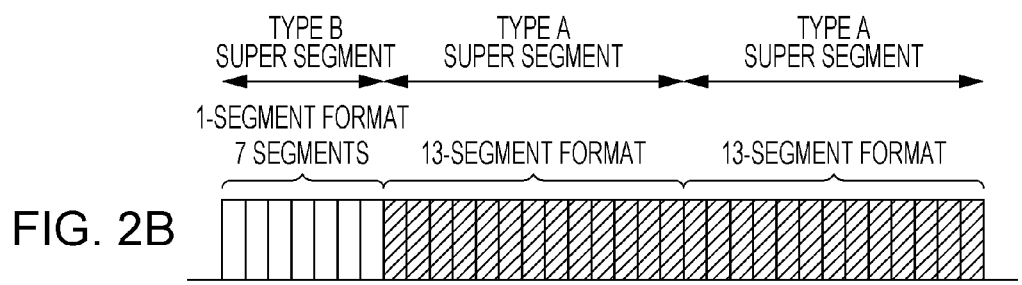
Figure 2C:
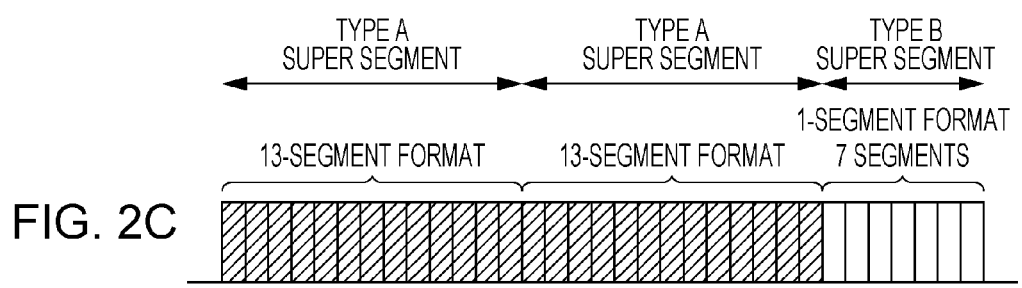

Reference is made to FIGS. 2A to 2C. The OFDM segment for the digital broadcasting transmission signal is configured by connecting (1) the OFDM segment (type-A super segment) in a thirteen-segment format in accordance with a transmission method for terrestrial digital television broadcasting and (2) a connection (type-B super segment) of fourteen or less OFDM segments in a one-segment format in accordance with a transmission method for terrestrial digital audio broadcasting (a connection of (1) and (2) is hereinafter referred to as a connected OFDM segment).

In the ISDB-Tmm, it is stipulated that the transmission is performed with one or more thirteen-segment formats included. Furthermore, because the number of the segments that are connection-transmitted is 33 at the maximum, when 33 segments are assumed to be connection-transmitted, as illustrated in FIGS. 2A to 2C, the transmission is possible with two thirteen-segment formats included at the maximum.

An arrangement pattern illustrated in FIG. 2A is a pattern in which the type-B super segment is arranged between the type-A super segments. The arrangement pattern illustrated in FIG. 2B is a pattern in which the type-A super segments are successively arranged after the type-B super segment. The arrangement pattern illustrated in FIG. 2C is a pattern in which the type-B super segment is arranged after the type-A super segments are successively arranged.

In cases of these arrangement patterns of the segments, the type-B super segment is transmitted and received in a state where the 7 segments in the one-segment format are connected one after another. Moreover, in an example illustrated here, the transmission and the reception are performed in the state where the 7 segments are connected one after another. However, the 7 segments may not be connected one after another, and the transmission and the reception may be possible with the arrangement pattern in which the 7 segments are separated from one another.

In this manner, in the ISDB-Tmm, there is a likelihood that the 7 segments in the one-segment format will be transmitted and received. In the transmission and reception system illustrated in FIG. 1, multiple segments in the one-segment format that are connection-transmitted in the ISDB-Tmm can be processed.

When the 7 segments in the one-segment format are connection-transmitted, the phase compensation is performed on the difference between the center frequencies. Phase rotation that is determined according to a difference between an RF frequency (ft) corresponding a direct-current component of a baseband signal for the connection transmission in accordance with the ISDB-Tmm and the RF center frequency (fr) of the segment to decode is performed for every symbol and the transmission is performed.

FIG. 3 is one portion of a table that expresses the difference f (fr–ft) between the center frequencies as the number of the segments and defines an amount of phase rotation compensation. The table comes from transmission method standard specifications, ARIB STD-B 46 version 1.2, for terrestrial multimedia broadcasting using a segment connection transmission method.

As illustrated in FIG. 3, an amount of phase compensation differs with a mode and a guard interval ratio. As the mode, there are three modes, a mode 1, a mode 2, and a mode 3. Furthermore, as the guard interval ratio, four ratios are stipulated, 1/32, 1/16, 1/8, and 1/4. Combinations of each mode and each guard interval ratio can be categorized into an eight-symbol period, a four-symbol period, a two-symbol period, and no-compensation.

For example, the combination of the mode 1 and the guard interval ratio of 1/32 is the eight-symbol period. It is understood from the table in FIG. 3 that a transition takes place in this sequence: 0, 3/8, 3/4, 1/8, 1/2, 7/8, 1/4, 5/8, and that the corresponding period is the eight-symbol period in which returning to 0 takes place in the eighth symbol.

In the same manner, the combination of the mode 1 and the guard interval ratio of 1/16 is the four-symbol period. The table in FIG. 3 shows that a sequence of 0, 3/4, 1/2, and 1/4 is repeated and that repetition takes place every four symbols.

In the same manner, the combination of the mode 1 and the guard interval ratio of 1/8 is the two-symbol period. The table in FIG. 3 shows that a sequence of 0 and 1/2 is repeated and that repetition takes place every two symbols. The combination of the mode 1 and the guard interval ratio of 1/4 is the no-compensation.

The combinations of the mode 1 or 2 and the guard interval 1/32, 1/16, 1/8, or 1/4 are not described. However, for the combinations of the mode 1 or 2 and the guard interval 1/32, 1/16, 1/8, or 1/4, the four-symbol period, the two-symbol period, or the no-compensation is available as well. That is, the amount of the phase compensation can be categorized as 8, 4, 2, or no-compensation. FIG. 4 illustrates a table that is obtained by making an amendment to a table of the amount of the phase compensation illustrated in FIG. 3, with these symbol periods in mind.

A table illustrated in FIG. 4 is a table in which the modes are arranged in the vertical direction, the guard interval ratios are arranged in the horizontal direction, and numerical values indicating a period are written in intersecting cells. The modes arranged in the vertical direction are the mode 1, mode 2, and the mode 3 from the top. The guard interval ratios arranged in the horizontal direction are GI 32 (equivalent to the guard interval ratio of 1/32 in the table in FIG. 3), GI 16 (1/16), GI 8 (1/8), and GI 4 (1/4) from the left.

For example, a numerical value of "8" is present in the intersecting cell where the mode 1 and GI 32 intersect, and this indicates that the amount of the phase compensation when the guard interval ratio in the mode 1 is 1/32 is the eight-symbol period. In the same manner, the amount of the phase compensation when the mode is the mode 1 and the guard interval ratio is GI 16 is the four-symbol period, and the amount of the phase compensation when the mode is the mode 1 and the guard interval ratio is GI 18 is the two-symbol period.

The amount of the phase compensation when the mode is the mode 2 and the guard interval ratio is GI 32 is the four-symbol period, and the amount of the phase compensation when the mode is the mode 2 and the guard interval ratio is GI 16 is the two-symbol period. The amount of the phase compensation when the mode is the mode 3 and the guard interval ratio is GI 32 is the two-symbol period. The amounts of the phase compensation in other cases are the no-compensation, and the no-compensation is expressed as "-" in the table.

In this manner, a period for the amount of the phase compensation, which is determined depending on parameters called the mode and the guard interval ratio, has a relationship illustrated in FIG. 4.

Setting of Initialization Timing

Incidentally, because the phase compensation is performed on the signal, which is connection-transmitted with the ISDB-Tmm or ISDB for terrestrial sound broadcasting (ISDB-Tsb), for every symbol according to the segment at the transmitting side, compensation corresponding to the phase compensation at the receiving side has to be performed. For example, in the head symbol in a frame, compensation for setting an amount of phase rotation to 0 is performed.

In the ISDB-Tmm, a stipulation on such compensation is as follows. "A phase rotation period at the transmitting side is an eight-symbol period at the maximum, and an accumulated phase difference is defined as two frames, $2n\pi$. For this reason, it is stipulated that in a head symbol in a frame, whose synchronization word for TMCC is w0, an amount of phase rotation is 0."

Such a stipulation comes from the transmission method standard specification, ARIB STD-B 46 version 1.2, for terrestrial multimedia broadcasting using the segment connection transmission method.

Figure 5:
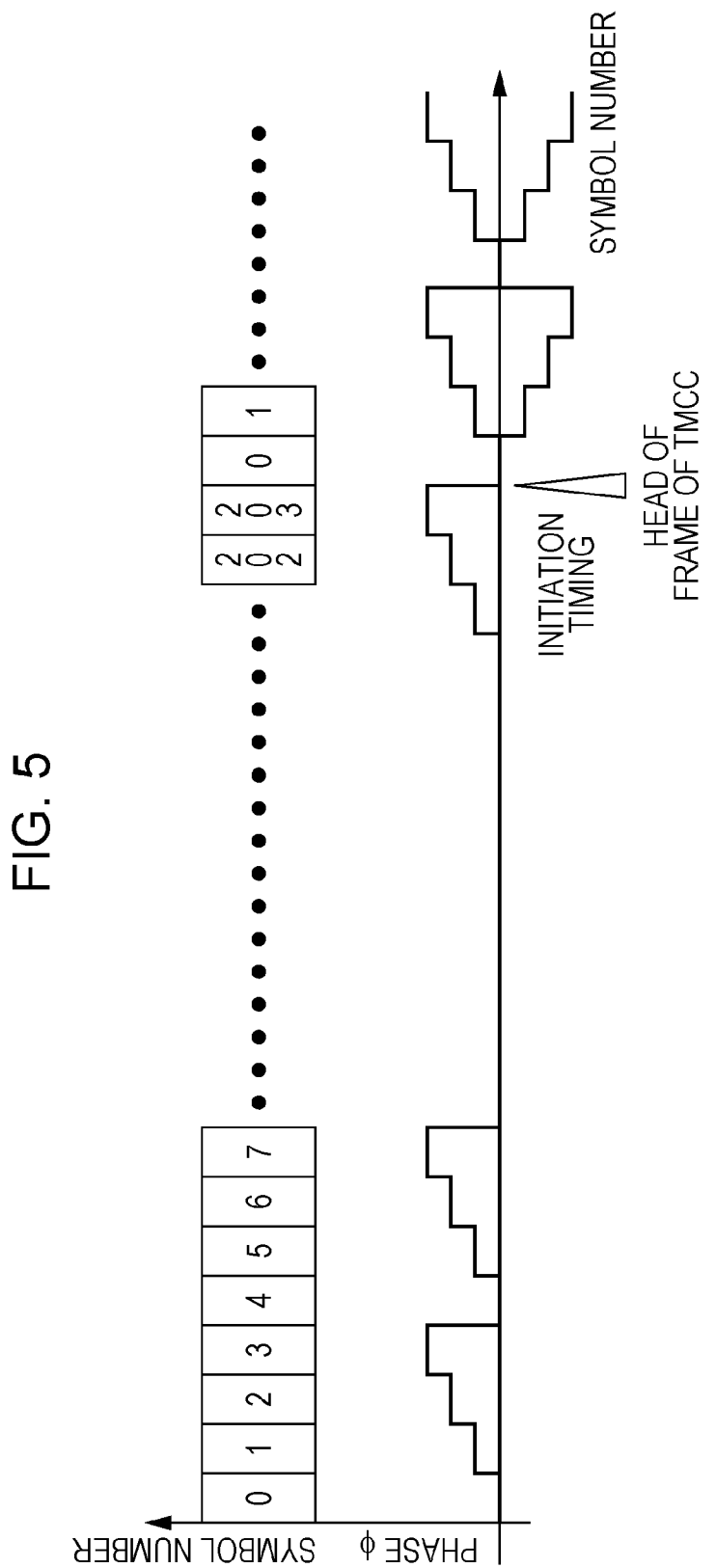
FIG. 5 is a diagram for describing initialization timing.

Based on the stipulation, a case where the amount of phase rotation of the head symbol in the frame is set to 0 is described referring to FIG. 5.

The upper portion of FIG. 5 indicates symbol numbers and each rectangle indicates the segment, and a numerical value within the segment indicates the symbol number. The upper side above a horizontal line on the lower portion of FIG. 5 indicates the amount of the phase compensation at the transmitting side, and the lower side indicates an amount of correction. If one frame is configured from 204 symbols, as illustrated in the upper portion of FIG. 5, one frame is configured from the segments whose symbol numbers range from 0 to 203, and thereafter the symbol number returns to 0 and the segments that make up the next frame are sequentially processed.

Furthermore, as described referring to FIG. 4, if the period for the amount of the phase compensation that depends on the parameters such as the mode and the guard interval ratio is the four-symbol period, the phase changes as illustrated above the horizontal line on the lower portion of FIG. 5. For example, the period occurs in which the symbol whose symbol number is 0 is 0 degrees, the symbol whose symbol number is 1 is 90 degrees, the symbol whose symbol number is 2 is 180 degrees, the symbol whose symbol number is 3 is 270 degrees, and the symbol whose symbol number is 4 returns to 0 degrees.

In the head symbol in the frame, whose synchronization word for the Transmission Multiplexing Configuration Control (TMCC) is w0, when the stipulation that the amount of phase rotation is set to 0 is complied with, TMCC information has to be decoded to investigate a synchronization word of the head symbol in the frame. Furthermore, information for at least one frame is necessary for decoding for TMCC.

If it is stipulated that one frame is assumed to be configured from 204 symbols, as illustrated in FIG. 5, at a time when the 204 segments whose symbol numbers range from 0 to 203 are obtained, a head of the frame for the TMCC is set and this point in time is defined as the initialization timing. After the initialization timing, as illustrated on the lower portion of FIG. 5, the amount of the correction is generated. The rotation correction is performed using the amount of the correction, and thus the correction is performed so that the amount of phase rotation is 0.

That is, in this case, the initialization timing can be obtained for the first time at the time when the 204 symbols are obtained. In the processing, there is a likelihood that it will take time before the initialization timing is determined and it will take time before synchronization is performed.

Furthermore, as illustrated in FIG. 1, the initialization timing has to be set by obtaining the 204 symbols.

In this manner, if the connected multiple segments are received and processed, the initialization timing has to be set in each segment, and because the initialization timing for each segment is set after the information for one frame is obtained, there is a likelihood that it will take a long time before the setting is performed. Accordingly, as described referring to FIG. 6 and subsequent figures, the initialization timing is set using a known signal.

Figure 6:
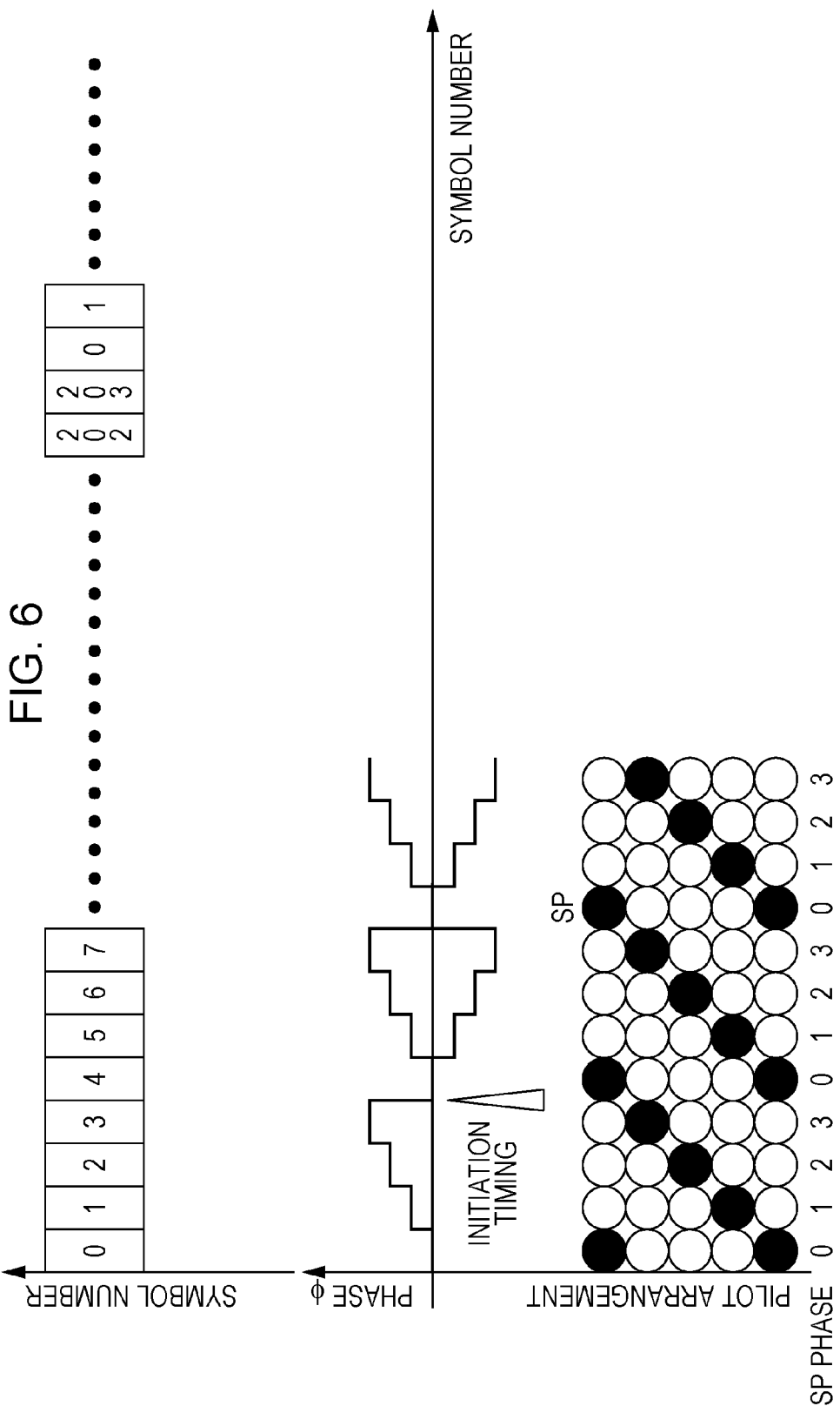
FIG. 6 is a diagram for describing the initialization timing.

The upper portion of FIG. 6, like the upper portion of FIG. 5, indicates the symbol numbers. The upper side above the horizontal line on the middle portion of FIG. 6, like that on the lower portion of FIG. 5, indicates the amount of the phase compensation for the transmitting side. The lower side below the horizontal line on the middle portion of FIG. 6, like that on the lower portion of FIG. 5, indicates the amount of the correction. The lower portion of FIG. 6 indicates pilot signals.

In an example of an arrangement of the pilot signal illustrated in the lower portion of FIG. 6, white circles indicate data carriers and black circles indicate pilot carriers (SP: Scattered Pilot) that are arranged in a scattered manner. The number of the patterns of the arrangement of the pilot signal illustrated in FIG. 6 is 4. When the five carriers arranged in the vertical direction are extracted, a pattern 0 is a pattern in which the pilot carriers are arranged on an uppermost first carrier and a lowermost fifth carrier, respectively, as described in a position at which an SP phase is described as 0.

A pattern 1 is a pattern in which the pilot carrier is arranged on a fourth carrier, the fourth one from the top, as described in a position at which the SP phase is described as 1. A pattern 2 is a pattern in which the pilot carrier is arranged on a third carrier, the third one from the top, as described in a position at which the SP phase is described as 2. A pattern 3 is a pattern in which the pilot carrier is arranged on a second carrier, the second one from the top, as described in a position at which the SP phase is described as 3.

In this manner, if the patterns 0 to 4 are present, the initialization timing can be set by recognizing these patterns. At this point, the initialization timing is defined as being set by the pattern 0.

As illustrated in FIG. 6, a time when the pattern 0 is detected is defined as the initialization timing. At this point, reference is made to FIG. 4. FIG. 4 is the table illustrating a relationship between the parameters and the periods. Periods at which the phase compensation is necessary are the eight-symbol period, the four-symbol period, and the two-symbol period.

For example, within the four-symbol period for the amount of the phase compensation, at the four-symbol period, the phase returns to 0. The four-symbol period for the amount of the phase compensation is made to correspond to the patterns 0 to 4 in a pilot arrangement, which are described referring to FIG. 6. For example, within the four-symbol period for the amount of the phase compensation, the amount of the phase compensation for a first symbol is defined as corresponding to the pattern 0 in the pilot arrangement, the amount of the phase compensation for a second symbol is defined as corresponding to the pattern 1, the amount of the phase compensation for a third symbol is defined as corresponding to the pattern 2, and the amount of the phase compensation for a fourth symbol is defined as corresponding to the pattern 3.

When such a correspondence relationship is established, and when the pattern 0 is detected, it can be determined that the corresponding period is the first symbol within the four-symbol period. Likewise, when the pattern 1 is detected, it can be determined that the corresponding period is the second symbol within the four-symbol period. Likewise, when the pattern 2 is detected, it can be determined that the corresponding period is the third symbol within the four-symbol period. Likewise, when the pattern 3 is detected, it can be determined that the corresponding period is the fourth symbol within the four-symbol period.

Furthermore, a phase of the first symbol within the four-symbol period is a phase that is equivalent to, for example, the symbol number "0", referring to the middle portion of FIG. 6, and therefore is "0". That is, in this case, the rotation correction does not have to be performed, and the symbol on which this correction does not have to be performed can be detected from the pattern of the pilot arrangement.

For these four patterns of the pilot arrangement, the amount of the phase compensation can be allocated even in a case of the two-symbol period. In the case of the two-symbol period, the phase returns to 0 at the two-symbol period. The two-symbol period is made to correspond to the patterns 0 to 4 that are described referring to FIG. 6. For example, within the four-symbol period for the amount of the phase compensation, the amount of the phase compensation for a first symbol is defined as corresponding to the pattern 0 or the pattern 2 in the pilot arrangement, and the amount of the phase compensation for a second symbol is defined as corresponding to the pattern 1 or the pattern 3.

When such a correspondence relationship is established, and when the pattern 0 or the pattern 2 in the pilot arrangement is detected, it can be determined that the corresponding period is the first symbol within the two-symbol period for the amount of the phase compensation. That is, like in the case of the four-symbol period, even in the case of the two-symbol period, when the pattern 0 or the pattern 2 is detected, the amount of the phase compensation is 0, and this point in time can be set as the initialization timing (synchronization timing).

At this point, even though the eight-symbol period is present as a period at which the phase compensation is necessary, the number of the patterns of the pilot arrangement is 4. When the two-symbol period or the eight-symbol period is considered in the same manner, it is considered that the amount of the phase compensation for a first symbol within the eight-symbol period is made to correspond to the pattern 0, the amount of the phase compensation for a second symbol is made to correspond to the pattern 1, the amount of the phase compensation for a third symbol is made to correspond to the pattern 2, and the amount of the phase compensation for a fourth symbol is made to correspond to the pattern 3.

Then, in the case of the eight-symbol period, furthermore, the amount of the phase compensation for a fifth symbol is made to correspond to the pattern 0, the amount of the phase compensation for a sixth symbol is made to correspond to the pattern 1, the amount of the phase compensation for a seventh symbol is made to correspond to the pattern 2, and the amount of the phase compensation for an eighth symbol is made to correspond to the pattern 3.

If the correspondence is established in this manner, the amounts of the phase compensation for a first symbol and a fifth symbol within the eight-symbol period are made to correspond to the pattern 0. Consequently, when the pattern 0 of the pilot arrangement is detected, there is a likelihood that whether the first symbol within the eight-symbol period for the amount of the phase compensation is detected or the fifth symbol is detected will not be correctly determined.

Consequently, if the phase compensation corresponds to the eight-symbol period, because there is a likelihood that the initialization (synchronization) timing will not be correctly set by detecting the pattern of the pilot arrangement, the initialization timing, as described above, is set using TMCC information.

Furthermore, if the phase compensation corresponds to the eight-symbol period, when the pattern 0 in the pilot arrangement is detected, two types of processing according to two systems are performed, one system in which the first symbol within the eight-symbol period is detected and thus processing is performed, and the other system in which the fifth symbol is detected and thus processing is performed, and information resulting from the system in which the correct processing is performed is selected. Thus, it is also possible to employ a configuration in which the processing proceeds continuously.

In this manner, according to the present technology, because the initialization timing is set by detecting the pattern of the pilot arrangement, it is possible to greatly shorten the time taken before the initialization timing is set. An example in FIG. 6 illustrates that when the symbol whose symbol number is 4 is processed, the pattern 0 in the pilot arrangement is detected and this point in time is set as the initialization timing. At any point in time after the initialization timing is established, an amount of rotation correction is calculated and the rotation correction is performed.

A comparison is made between the example illustrated in FIG. 6 and the example illustrated in FIG. 5. While in the example illustrated in FIG. 5, when the 204 symbols whose symbol numbers range from 0 to 203 are processed, the initialization timing is set, in the example illustrated in FIG. 6, when the five symbols whose symbol numbers range from 0 to 4 are processed, the initialization timing is set.

In this manner, the initialization timing can be set at an earlier stage, when the pattern of the pilot arrangement is detected and thus the initialization timing is set, than when the initialization timing is set using the TMCC information. That is, according to the present technology, it is possible to greatly shorten the time taken before the initialization (synchronization) timing is set.

Moreover, in the example illustrated in FIG. 6, when the symbol whose symbol number is 4 is processed, the pattern 0 in the pilot arrangement is detected, and the initialization timing is set. However, when the symbol whose symbol number is 0 is processed, the pattern 0 of the pilot arrangement is detected, and at this point in time, it is also possible to set the initialization timing.

Furthermore, at this point, the description continues with the example in which the pilot signal is used as the known signal, but signals other than the pilot signal may be used. Any known signal can be used as the known signal for the present technology, as long as its phase has multiple patterns such as the patterns 0 to 4 described above.

Configuration of a Setting Unit

Figure 7:
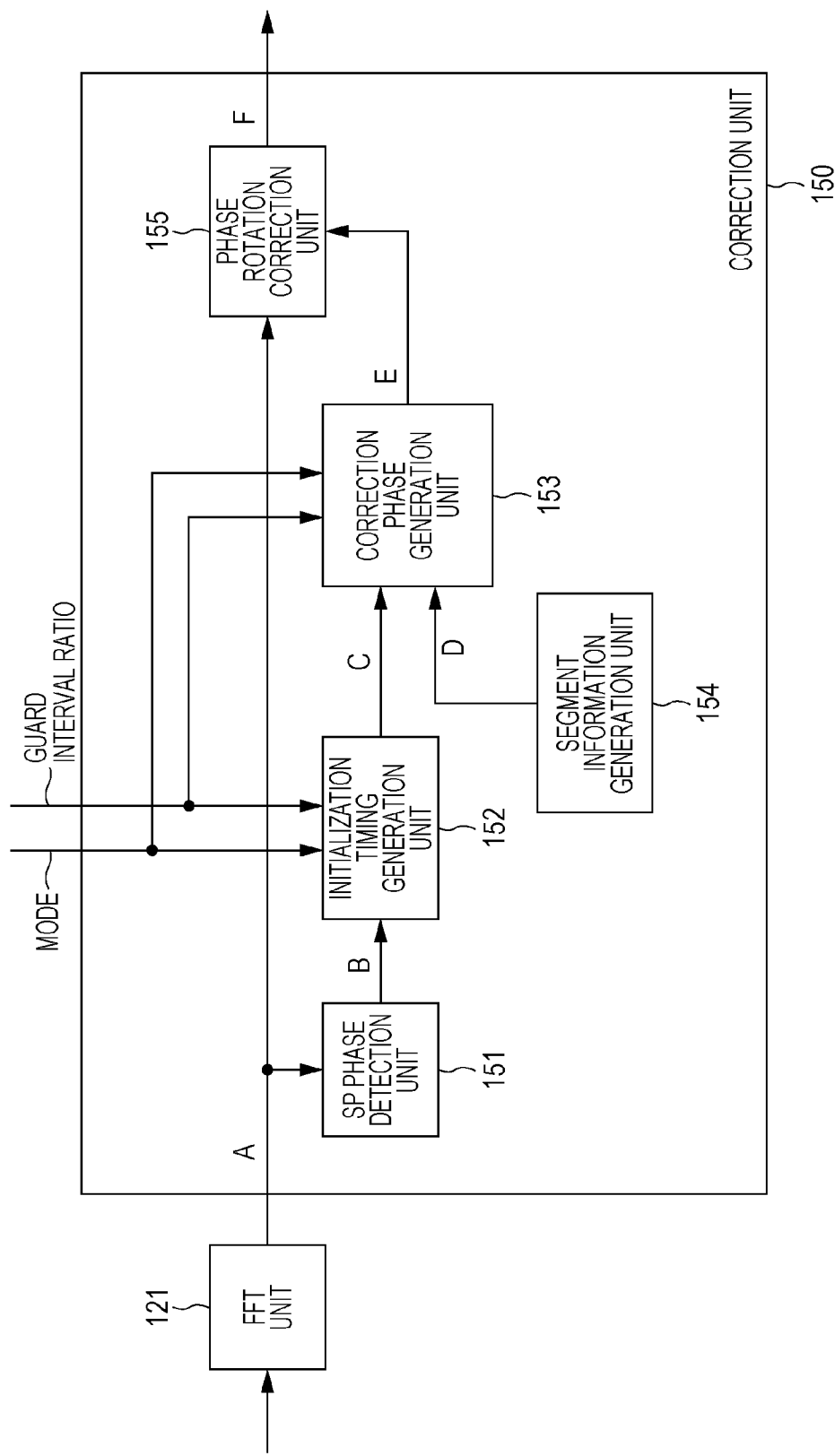
FIG. 7 is a diagram illustrating a configuration of a setting unit according to one embodiment, to which the present technology applies.

A configuration of a correction unit that sets such initialization timing and performs the phase compensation will be described. FIG. 7 is a diagram illustrating a configuration of a correction unit 150 according to one embodiment. The correction unit 150 illustrated in FIG. 7, as described, is a correction unit that corrects the amount of the phase compensation for each one of the segments that are connection-transmitted in a state where the multiple phase-compensated segments are connected one after another. The signal on which FFT processing is performed in the FFT unit 121 is input into the correction unit 150.

The correction unit 150 is configured to include an SP phase detection unit 151, an initialization timing generation unit 152, a correction phase generation unit 153, a segment information generation unit 154, and a phase rotation correction unit 155.

The segment in a frequency domain, which is output from the FFT unit 121 is supplied to the SP phase detection unit 151 and the phase rotation correction unit 155. The SP phase detection unit 151, as illustrated in FIG. 6, detects the pattern of the pilot arrangement of the pilot signal.

The initialization timing generation unit 152 generates a flag that is set to ON at the time of the initialization timing. Information on transmission parameters such as the mode or the guard interval ratio is also supplied from a processing unit not illustrated to the initialization timing generation unit 152. The information on the mode or the guard interval ratio is detected in processing in an earlier time domain than in the FFT unit 121. The detected information is supplied to the initialization timing generation unit 152.

The initialization timing generation unit 152 determines the period for the amount of the phase compensation from the mode and the guard interval ratio, and determines which pattern of the patterns 0 to 3 the pattern of the pilot arrangement, which is supplied from the SP phase detection unit 151 is. Thus, the initialization timing is set.

That is, if it is determined that the period for the amount of the phase compensation is, for example, the four-symbol period and the pattern of the pilot arrangement is the pattern 0, the initialization timing generation unit 152, as described above, determines that this point in time is the initialization timing and sets the flag to ON.

In this manner, based on the phase of the known signal, such as the pilot signal, the initialization timing generation unit 152 generates a timing at which the amount of the phase compensation for the obtained segment is initialized. Furthermore, the phase of the known signal has multiple patterns, and the initialization timing generation unit 152 detects a predetermined pattern from the multiple patterns and thus generates the initialization timing. The predetermined pattern can be defined as the timing at which the amount of the phase compensation is 0.

Because an amount of phase shift varies with the parameters (the mode or the guard interval ratio) described referring to FIG. 3 or 4, the correction phase generation unit 153 sets a value of the amount of phase shift and thus generates the amount of the correction for applying suitable rotation. The information on the mode or on the guard interval ratio is supplied from the processing unit not illustrated also to the correction phase generation unit 153, in order for the parameters to become known.

The segment information generation unit 154 generates a number that is a number specific to the segment and indicates a position from the center.

The phase rotation correction unit 155 performs compensation processing that phase-rotates the symbol from the FFT unit 121 by the amount of the correction from the correction phase generation unit 153.

Operation of the Setting Unit

Figure 8:
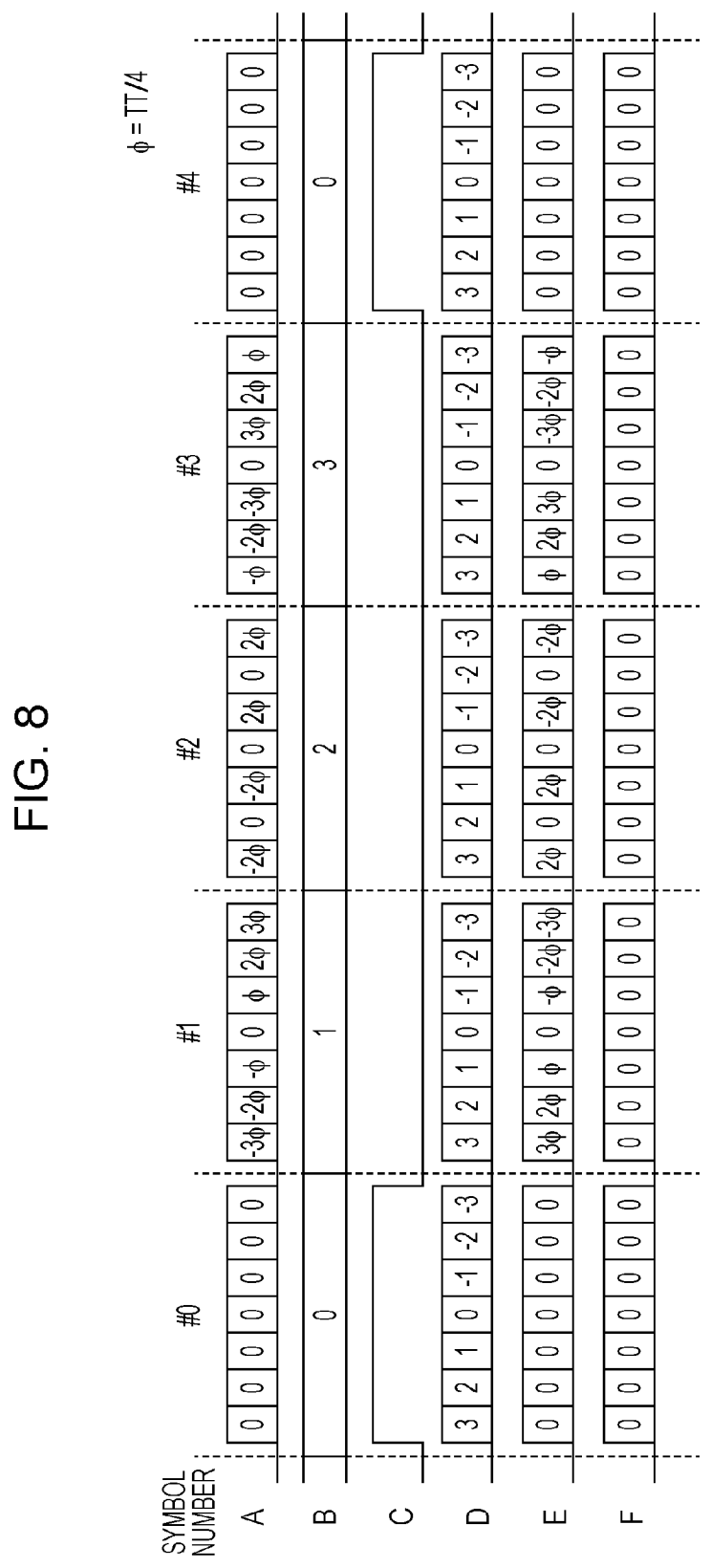

Moreover, operation of the correction unit 150 is in addition described referring to FIG. 8. #0, #1, #2, #3, and #4 that are described on the upper portion of FIG. 8 indicate the symbol numbers, respectively. A of FIG. 8 illustrates data that is viewed from a position that is described as "A" in FIG. 7. A of FIG. 8 illustrates the segments that are supplied from the FFT unit 121 to the SP phase detection unit 151 and the phase rotation correction unit 155 in FIG. 7.

B of FIG. 8 illustrates data that is viewed from a position that is described as "B" in FIG. 7. B of FIG. 8 illustrates data that is output from the SP phase detection unit 151 and is supplied to the initialization timing generation unit 152 in FIG. 7. C of FIG. 8 illustrates data that is viewed from a position that is described as "C" in FIG. 7. B of FIG. 8 illustrates data that is output from the initialization timing generation unit 152 and is supplied to the correction phase generation unit 153.

D of FIG. 8 illustrates data that is viewed from a position that is described as "D" in FIG. 7. D of FIG. 8 illustrates data that is output from the segment information generation unit 154 and is supplied to the correction phase generation unit 153. E of FIG. 8 illustrates data that is viewed from a position that is described as "E" in FIG. 7. E of FIG. 8 illustrates data that is output from the correction phase generation unit 153 and is supplied to the phase rotation correction unit 155.

F of FIG. 8 illustrates data that is viewed from a position that is described as "F" in FIG. 7. F of FIG. 8 illustrates data that is output from the correction phase generation unit 153 and is supplied to the phase rotation correction unit 155. A description is provided referring to FIG. 8, using an example in which the period for the amount of the phase compensation is the four-symbol period.

Reference is made to A of FIG. 8. A of FIG. 8 is a diagram illustrating the segment that is output from the FFT unit 121 and is supplied to the SP phase detection unit 151 and the phase rotation correction unit 155. Each rectangle indicates one segment. A number within each rectangle indicates the amount of the phase compensation. In this case, because an example is described in which 7 segments are connection-transmitted, when the symbol number is #0, the number of the segments to process is 7. Each one of the 7 segments is processed.

The amount of the phase compensation for each one of the segments whose symbol number is #0 is "0". At this time, the SP phase detection unit 151 detects the pattern 0 as the pattern of the pilot arrangement. Consequently, as illustrated in B of FIG. 8, the SP phase detection unit 151 outputs data indicating "0" to the initialization timing generation unit 152.

Because the information (information relating to the parameters) relating to the mode or the guard interval ratio is given by the processing unit not illustrated to the initialization timing generation unit 152, in this case, it is recognized that the period for the amount of the phase compensation is the four-symbol period. The initialization timing generation unit 152, as illustrated in C of FIG. 8, outputs a signal in which the flag is set to ON, to the correction phase generation unit 153, in response to the period being the four-symbol period and the pattern 0 being input.

While the processing is performed in this manner, the segment information generation unit 154 generates segment information as illustrated in D of FIG. 8, and supplies the generated segment information to the correction phase generation unit 153. The segment information is data in which, as illustrated in D of FIG. 8, the segment positioned in the middle of the 7 segments is set to "0", 1, 2 and 3 are sequentially allocated in the leftward direction from the middle of the 7 segments in the drawing, and −1, −2, and −3 are sequentially allocated in the rightward direction from the middle. That is, the segment information is the data in which 3, 2, 1, 0, −1, −2, and −3 are sequentially allocated from left to right in D of FIG. 8.

When the segment whose symbol number is #0 is a processing target, the items of data illustrated in C and D of FIG. 8 are supplied to the correction phase generation unit 153. Because the flag from the initialization timing generation unit 152 is set to ON, the correction phase generation unit 153 recognizes that this point in time is the initialization timing and outputs data for initialization. That is, in this case, as illustrated in E of FIG. 8, the data in which the amount of the correction for each segment is set to "0" is generated and the generated data is output to the phase rotation correction unit 155.

The symbol of the segment illustrated in A of FIG. 8 and the amount of the correction illustrated in E of FIG. 8 are supplied to the phase rotation correction unit 155. The phase rotation correction unit 155 rotation-corrects the symbol of each segment illustrated in A of FIG. 8 with data illustrated in E of FIG. 8 being defined as the amount of the correction, and outputs the result of the rotation correction. The symbol being output is a symbol for which the amount of the phase compensation is 0 as a result of the rotation correction as illustrated in F of FIG. 8.

After the segment whose symbol number is #0 is processed, the segment whose symbol number is #1 is processed. As illustrated in a position of the symbol number #1 in A of FIG. 8, the amounts of the phase compensation $\phi$, $2\phi$, and $3\phi$ are sequentially allocated, in the leftward direction from the middle of the 7 segments, to the segments whose symbol number is #1, respectively, and the amounts of the phase compensation $-\phi$, $-2\phi$, and $-3\phi$ are sequentially allocated, in the rightward direction, to the segments whose symbol number is #1, respectively. That is, the amounts of the phase compensation $-3\phi$, $-2\phi$, $-\phi$, 0, $\phi$, $2\phi$, and $3\phi$ are sequentially allocated to the segments whose symbol number is #1 from left to right in A of FIG. 8, respectively.

At this time, the SP phase detection unit 151 detects the pattern 1 as the pattern of the pilot arrangement. Consequently, as illustrated in B of FIG. 8, the SP phase detection unit 151 outputs data indicating "1" to the initialization timing generation unit 152.

The initialization timing generation unit 152 recognizes that the period for the amount of the phase compensation is the four-symbol period. The initialization timing generation unit 152, as illustrated in C of FIG. 8, outputs a signal in which the flag is set to OFF, to the correction phase generation unit 153, in response to the period being the four-symbol period and the pattern 1 being input.

While the processing is performed in this manner, the segment information generation unit 154 generates segment information as illustrated in D of FIG. 8, and supplies the generated segment information to the correction phase generation unit 153. The segment information is data in which, as illustrated in D of FIG. 8, the segment positioned in the middle of the 7 segments is set to "0", and 3, 2, 1, 0, −1, −2 and −3 are sequentially allocated from left to right in D of FIG. 8, in the same manner as when the symbol number #0 is processed. When the 7 segments being connected one after another are processed, such data is output from the segment information generation unit 154.

When the segment whose symbol number is #1 is a processing target, the items of data illustrated in C and D of FIG. 8 are supplied to the correction phase generation unit 153. Because the flag from the initialization timing generation unit 152 is set to OFF, the correction phase generation unit 153 recognizes that this point in time is not the initialization timing and outputs the amount of the correction for correcting the amount of the phase compensation. That is, in this case, as illustrated in E of FIG. 8, the amounts of correction $3\phi$, $2\phi$, $\phi$, 0, $-\phi$, $-2\phi$, and $-3\phi$ are sequentially generated from left to right in E of FIG. 8 and are output to the phase rotation correction unit 155.

The amount of the correction can be obtained as a value that results from multiplying the segment information from the segment information generation unit 154 by $\phi$. Furthermore, because it is detected that the pattern of the pilot arrangement is the pattern 1 and information, "1", as illustrated in B of FIG. 8, is output from the SP phase detection unit 151, the value, $\phi$, can be obtained as a value that results from multiplying "1" by $\phi$.

In this case, as illustrated in D of FIG. 8, the pieces of segment information from the segment information generation unit 154 are 3, 2, 1, 0, −1, −2, and −3. When these are multiplied by $\phi$, $3\phi$, $2\phi$, $\phi$, 0, $-\phi$, $-2\phi$, and $-3\phi$ are obtained that are the amounts of correction illustrated in E of FIG. 8.

The symbol of the segment illustrated in A of FIG. 8 and the amount of the correction illustrated in E of FIG. 8 are supplied to the phase rotation correction unit 155. The phase rotation correction unit 155 rotation-corrects the symbol of each segment illustrated in A of FIG. 8 with data illustrated in E of FIG. 8 being defined as the amount of the correction, and outputs the result. The symbol being output is a symbol for which the amount of the phase compensation is 0 as a result of the rotation correction as illustrated in F of FIG. 8.

After the segment whose symbol number is #1 is processed, the segment whose symbol number is #2 is processed. As illustrated in a position of the symbol number #2 in A of FIG. 8, the amounts of the phase compensation $-2\phi$, 0, $-2\phi$, 0, $2\phi$, 0, and $2\phi$ are sequentially allocated from left to right in A of FIG. 8 to the segments whose symbol number is #2, respectively.

At this time, the SP phase detection unit 151 detects the pattern 2 as the pattern of the pilot arrangement. Consequently, as illustrated in B of FIG. 8, the SP phase detection unit 151 outputs data indicating "2" to the initialization timing generation unit 152.

The initialization timing generation unit 152, as illustrated in C of FIG. 8, outputs a signal in which the flag is set to OFF, to the correction phase generation unit 153, in response to the period for the amount of phase correction being the four-symbol period and the pattern 2 being input.

While the processing is performed in this manner, the segment information generation unit 154 generates segment information as illustrated in D of FIG. 8, and supplies the generated segment information to the correction phase generation unit 153. The segment information is the data in which 3, 2, 1, 0, −1, −2, and −3 are sequentially allocated from left to right in D of FIG. 8.

When the segment whose symbol number is #2 is a processing target, the items of data illustrated in C and D of FIG.

8 are supplied to the correction phase generation unit 153. Because the flag from the initialization timing generation unit 152 is set to OFF, the correction phase generation unit 153 recognizes that this point in time is not the initialization timing and outputs the amount of the correction for correcting the amount of the phase compensation. That is, in this case, as illustrated in E of FIG. 8, the amounts of correction 2φ, 0, 2φ, 0, −2φ, 0, and −2φ are generated from left to right in the drawing and are output to the phase rotation correction unit 155.

The amount of the correction can be obtained as a value that results from multiplying the segment information from the segment information generation unit 154 by 2φ. Furthermore, because it is detected that the pattern of the pilot arrangement is the pattern 2 and information, "2", as illustrated in B of FIG. 8, is output from the SP phase detection unit 151, the value, 2φ, can be obtained as a value that results from multiplying "2" by φ.

In this case, as illustrated in D of FIG. 8, the pieces of segment information from the segment information generation unit 154 are 3, 2, 1, 0, −1, −2, and −3. When these are multiplied by 2φ, 6φ, 4φ, 2φ, 0, −2φ, −4φ, and −6φ are obtained, but because 4φ=0, 6φ, 4φ, 2φ, 0, −2φ, −4φ, and −6φ are changed to 2φ, 0, 2φ, 0, −2φ, 0, and −2φ, respectively, that are the amounts of correction illustrated in E of FIG. 8.

The symbol of the segment illustrated in A of FIG. 8 and the amount of the correction illustrated in E of FIG. 8 are supplied to the phase rotation correction unit 155. The phase rotation correction unit 155 rotation-corrects the symbol of each segment illustrated in A of FIG. 8 with data illustrated in E of FIG. 8 being defined as the amount of the correction, and outputs the result. The symbol being output is a symbol for which the amount of the phase compensation is 0 as a result of the rotation correction as illustrated in F of FIG. 8.

After the segment whose symbol number is #2 is processed, the segment whose symbol number is #3 is processed. As illustrated in a position of the symbol number #3 in A of FIG. 8, the amounts of the phase compensation −φ, −2φ, −3φ, 0, 3φ, 2φ, and φ are sequentially allocated from left to right in A of FIG. 8 to the segments whose symbol number is #3, respectively.

At this time, the SP phase detection unit 151 detects the pattern 3 as the pattern of the pilot arrangement. Consequently, as illustrated in B of FIG. 8, the SP phase detection unit 151 outputs data indicating "3" to the initialization timing generation unit 152.

The initialization timing generation unit 152, as illustrated in C of FIG. 8, outputs a signal in which the flag is set to OFF, to the correction phase generation unit 153, in response to the period for the amount of phase correction being the four-symbol period and the pattern 3 being input.

While the processing is performed in this manner, the segment information generation unit 154 generates segment information as illustrated in D of FIG. 8, and supplies the generated segment information to the correction phase generation unit 153. The segment information is the data in which 3, 2, 1, 0, −1, −2, and −3 are sequentially allocated from left to right in D of FIG. 8.

When the segment whose symbol number is #3 is a processing target, the items of data illustrated in C and D of FIG. 8 are supplied to the correction phase generation unit 153. Because the flag from the initialization timing generation unit 152 is set to OFF, the correction phase generation unit 153 recognizes that this point in time is not the initialization timing and outputs the amount of the correction for correcting the amount of the phase compensation. That is, in this case, as illustrated in E of FIG. 8, the amounts of correction φ, 2φ, 3φ, 0, −3φ, −2φ, and −φ are generated from left to right in the drawing and are output to the phase rotation correction unit 155.

The amount of the correction can be obtained as a value that results from multiplying the segment information from the segment information generation unit 154 by 3φ. Furthermore, because it is detected that the pattern of the pilot arrangement is the pattern 3 and information, "3", as illustrated in B of FIG. 8, is output from the SP phase detection unit 151, the value, 3φ, can be obtained as a value that results from multiplying "3" by φ.

In this case, as illustrated in D of FIG. 8, the pieces of segment information from the segment information generation unit 154 are 3, 2, 1, 0, −1, −2, and −3. When these are multiplied by 3φ, 9φ, 6φ, 3φ, 0, −3φ, −6φ, and −9φ are obtained, but because 4φ=0, 9φ, 6φ, 3φ, 0, −3φ, −6φ, and −9φ are changed to φ, 2φ, 3φ, 0, −3φ, −2φ, and −1φ, respectively, that are the amounts of correction illustrated in E of FIG. 8.

The symbol of the segment illustrated in A of FIG. 8 and the amount of the correction illustrated in E of FIG. 8 are supplied to the phase rotation correction unit 155. The phase rotation correction unit 155 rotation-corrects the symbol of each segment illustrated in A of FIG. 8 with data illustrated in E of FIG. 8 being defined as the amount of the correction, and outputs the result. The symbol being output is a symbol for which the amount of the phase compensation is 0 as a result of the rotation correction as illustrated in F of FIG. 8.

After the segment whose symbol number is #3 is processed, the segment whose symbol number is #4 is processed. As illustrated in a position of the symbol number #4 in A of FIG. 8, the amounts of the phase compensation 0, 0, 0, 0, 0, 0, and 0 are sequentially allocated from left to right in A of FIG. 8 to the segments whose symbol number is #4, respectively.

That is, in this case, because the period for the amount of the phase compensation is the four-symbol period, the amount of the phase compensation for the segment whose symbol number is #4 is the same as the amount of the phase compensation for the segment whose symbol number is #0. Consequently, because processing is the same as with the segment whose symbol number is #0, a description of the processing is omitted.

In this manner, the phase correction is performed on the segments that are connection-transmitted.

Processing Associated with Setting of Initialization Timing

Figure 9:
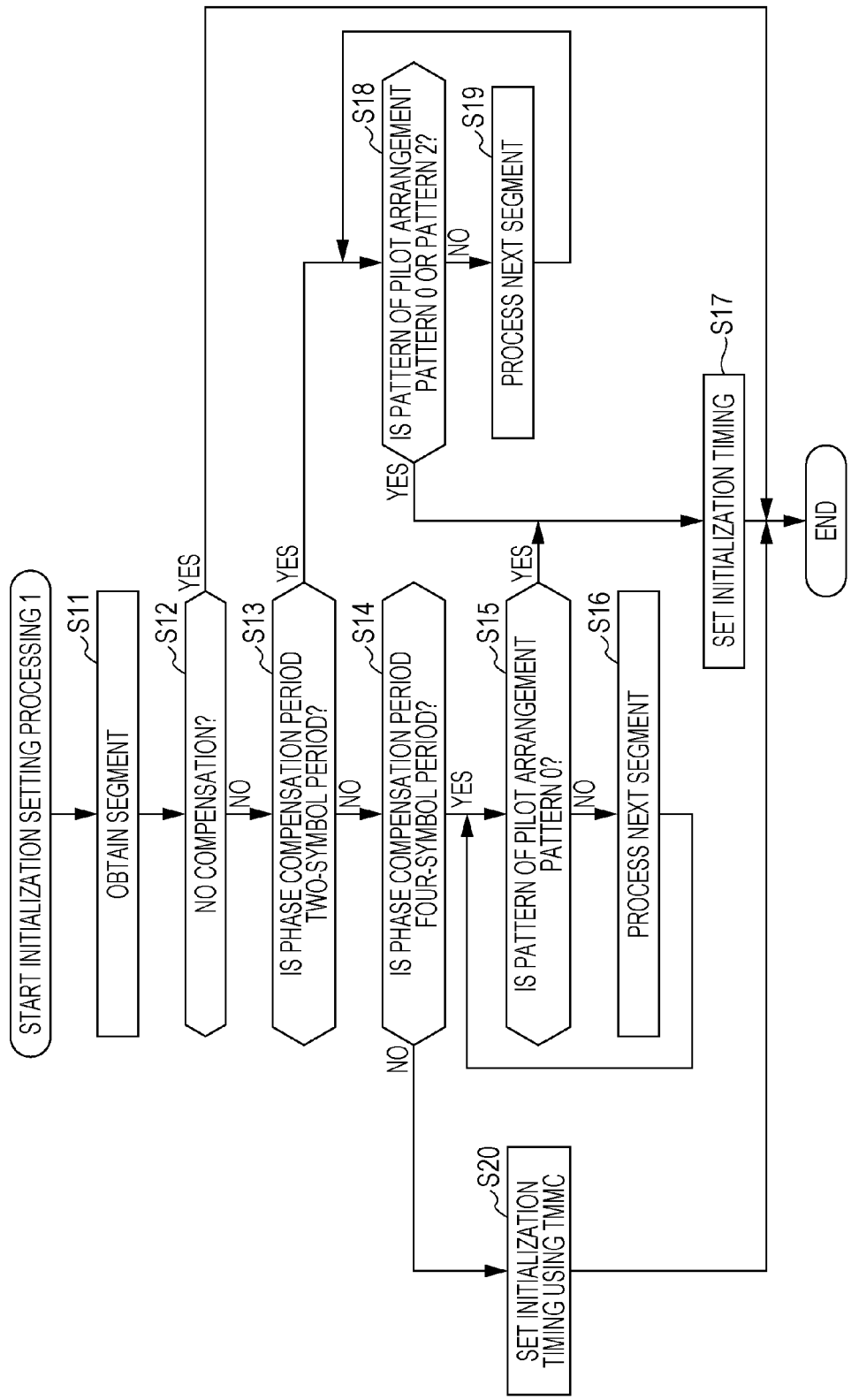
FIG. 9 is a flowchart for describing processing by the setting unit.

Moreover, processing by the correction unit 150, particularly, processing associated with setting of the initialization (synchronization) timing is in addition described referring to a flowchart illustrated in FIG. 9.

In Step S11, the correction unit 150 obtains the segments. In the example described above, the 7 segments being connected one after another are obtained. In Step S12, the initialization timing generation unit 152 determines whether or not the phase compensation is present.

As described referring to FIG. 4, for example, GI 4 in the mode 1 and the like correspond to no-compensation. The initialization timing generation unit 152 determines whether or not the obtained segment is a no-compensation segment, from the information (information on the parameters) on the mode or on the guard interval ratio that is supplied from the processing unit not illustrated.

In Step S12, if it is determined that the obtained segment is the no-compensation segment, processing associated with initialization setting is terminated. On the other hand, in Step S12, if it determined that the obtained segment is not the no-correction segment, the processing proceeds to Step S13.

In Step S13, with the information on the parameters from the processing unit not illustrated, the initialization timing generation unit 152 determines whether or not the period for the amount of the phase compensation is the two-symbol period.

In Step S13, if it is determined that the period for the amount of the phase compensation is not the two-symbol period, the processing proceeds to Step S14. In Step S14, it is determined whether or not the period for the amount of the phase compensation is the four-symbol period. In Step S14, if it is determined that the period for the amount of the phase compensation is the four-symbol period, the processing proceeds to Step S15.

In Step S15, the initialization timing generation unit 152 determines whether or not an output from the SP phase detection unit 151 indicates that the pattern of the pilot arrangement which is included in the segment being input is the pattern 0. In Step S15, if it is determined that the pattern of the pilot arrangement is not the pattern 0, the processing proceeds to Step S16.

In Step S16, the next segment is processed. In Step S15, it is determined whether or not the pattern of the pilot arrangement, included in the processed segment, is the pattern 0. That is, the segments that are sequentially supplied are processed until it is determined that the pattern of the pilot arrangement is the pattern 0.

In Step S15, if it is determined that the pattern of the pilot arrangement is the pattern 0, the processing proceeds to Step S17. In this case, because the period for the amount of the phase compensation is the four-symbol period, and the pattern of the pilot arrangement is the pattern 0, as described above, this point in time is a timing at which the initialization timing is set.

Consequently, in Step S17, the initialization timing generation unit 152 sets the initialization timing. The setting, as described referring to FIG. 8, is performed by supplying the signal in which the flag indicating that this point in time is the initialization timing is set to ON from the initialization timing generation unit 152 to the correction phase generation unit 153.

On the other hand, in Steps S13, if it is determined that the period for the amount of the phase compensation is the two-symbol period, the processing proceeds to Step S18. In Step S18, it is determined whether or not the pattern of the pilot arrangement is the pattern 0 or the pattern 2.

If it is determined that the period for the amount of the phase compensation is the two-symbol period, when the pattern of the pilot arrangement is the pattern 0 or the pattern 2, the initialization timing is set. Consequently, in Step S18, it is determined whether or not the pattern of the pilot arrangement is the pattern 0 or the pattern 2.

Furthermore, if the period for the amount of the phase compensation is the two-symbol period and the pattern of the pilot arrangement is the pattern 0 or the pattern 2, the initialization timing generation unit 152 outputs the signal in which the flag is set to ON.

In Step S18, if it is determined that the pattern of the pilot arrangement is neither the pattern 0 nor the pattern 2, the processing proceeds to Step S19. In Step S19, the next segment is processed. In Step S18, it is determined whether or not the pattern of the pilot arrangement, included in the processed segment is the pattern 0 or the pattern 2. That is, the segments that are sequentially supplied are processed until it is determined that the pattern of the pilot arrangement is the pattern 0 or the pattern 2.

In Step S18, if it is determined that the pattern of the pilot arrangement is the pattern 0 or the pattern 2, the processing proceeds to Step S17. As described above, in Step S17, the initialization timing is set. In this case, because the period for the amount of the phase compensation is the two-symbol period, the amount of the phase compensation is 0 for every 2 symbols. At the timing at which the amount of the phase compensation is 0, the initialization timing is defined as being set.

On the other hand, in Step S14, if it is determined that the period for the amount of the phase compensation is not the four-symbol period, the processing proceeds to Step S20. If the processing proceeds to Step S20, this occurs when it is determined that the period for the amount of the phase compensation is the eight-symbol period. Consequently, in Step S20, the initialization timing is set by using the TMCC.

In this manner, the initialization timing is set. Consequently, when the period for the amount of the phase compensation is the two-symbol period or the four-symbol period, it is possible to more greatly shorten the time taken before setting the initialization timing than when the TMCC information is used. In this manner, the synchronization can be increased in speed by using information on the symbol number during demodulation.

Configuration of and Processing by the Setting Unit Associated with Setting Other than the Initialization Timing Incidentally, according to the embodiment described above, the time when the pattern of the pilot arrangement is the pattern 0 or the pattern 2, in other words, the time when amount of the phase compensation for each one of the segments being connected one after another is 0 is detected, and the initialization timing is set. However, it may be possible to set the initialization timing even at the time when the pattern of the pilot arrangement is any pattern among the patterns 0 to 3.

For example, if the period for the amount of the phase compensation is the four-symbol period, the first symbol within the four-symbol period is defined as corresponding to the pattern 0 of the pilot arrangement, the second symbol is defined as corresponding to the pattern 1, the third symbol is defined as corresponding to the pattern 2, and the fourth symbol is defined as corresponding to the pattern 3. Because such a correspondence relationship is established, when attention is paid to the amount of the phase compensation for a predetermined segment, for example, a relationship can be derived as follows. If the pattern of the pilot arrangement is the pattern 0, the amount of the phase compensation is 0. If the pattern of the pilot arrangement is the pattern 1, the amount of the phase compensation is $\phi$. If the pattern of the pilot arrangement is the pattern 2, the amount of the phase compensation is $2\phi$. If the pattern of the pilot arrangement is the pattern 3, the amount of the phase compensation is $3\phi$.

If this relationship is used, for example, if the pattern of the pilot arrangement is the pattern 0, because the amount of the phase compensation is 0, the amount of the correction is set to 0, and the phase rotation correction is performed. In the same manner, if the pattern of the pilot arrangement is the pattern 1, because the amount of the phase compensation is $\phi$, the amount of the correction is $-\phi$. If the pattern of the pilot arrangement is the pattern 2, because the amount of the phase compensation is $2\phi$, the amount of the correction is $-2\phi$. If the pattern of the pilot arrangement is the pattern 3, because the amount of the phase compensation is $3\phi$, the amount of the correction is $-3\phi$. A configuration can also be employed in which the phase rotation correction is performed for each one of these cases.

Figure 10:
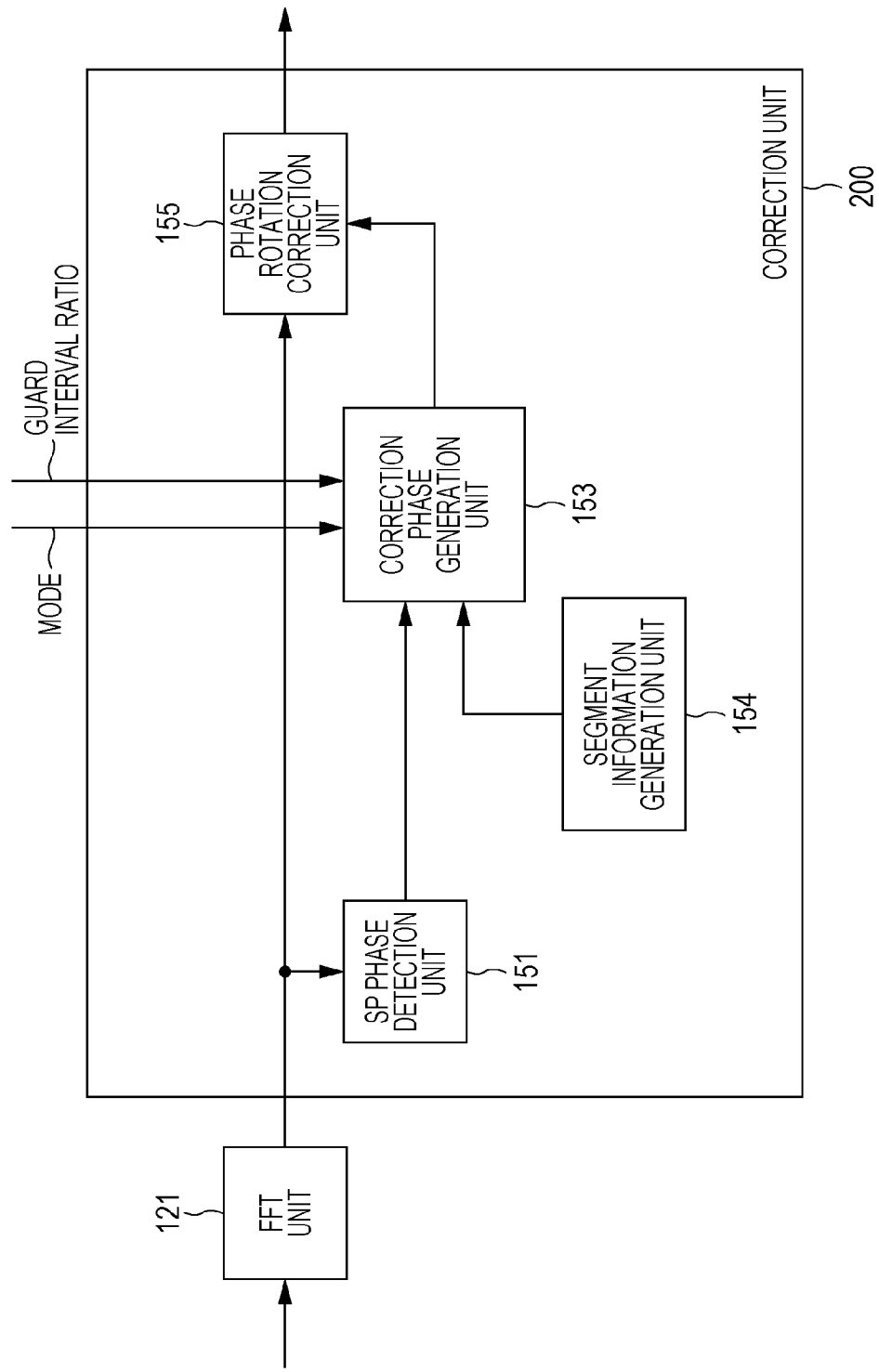
FIG. 10 is a diagram of another configuration of the setting unit to which the present technology applies.

FIG. 10 illustrates a configuration of the correction unit 150 in which such processing is performed. The processing by the correction unit 150 with this configuration is described referring to a flowchart in FIG. 11.

FIG. 10 is a diagram illustrating another configuration of a correction unit 200. A correction unit in FIG. 10 is described as the correction unit 200 in order to distinguish the correction unit in FIG. 10 from the correction unit 150 illustrated in FIG. 7. The configuration of the correction unit 200 illustrated in FIG. 10 is a configuration that is obtained by removing the initialization timing generation unit 152 from the configuration of the correction unit 150 illustrated in FIG. 7. Like reference numerals are given to the same components as those in FIG. 7, and descriptions of the same components are omitted.

The correction unit 200 illustrated in FIG. 10 is configured in such a manner that information relating to the pattern is input from the SP phase detection unit 151 directly into the correction phase generation unit 153.

Figure 11:
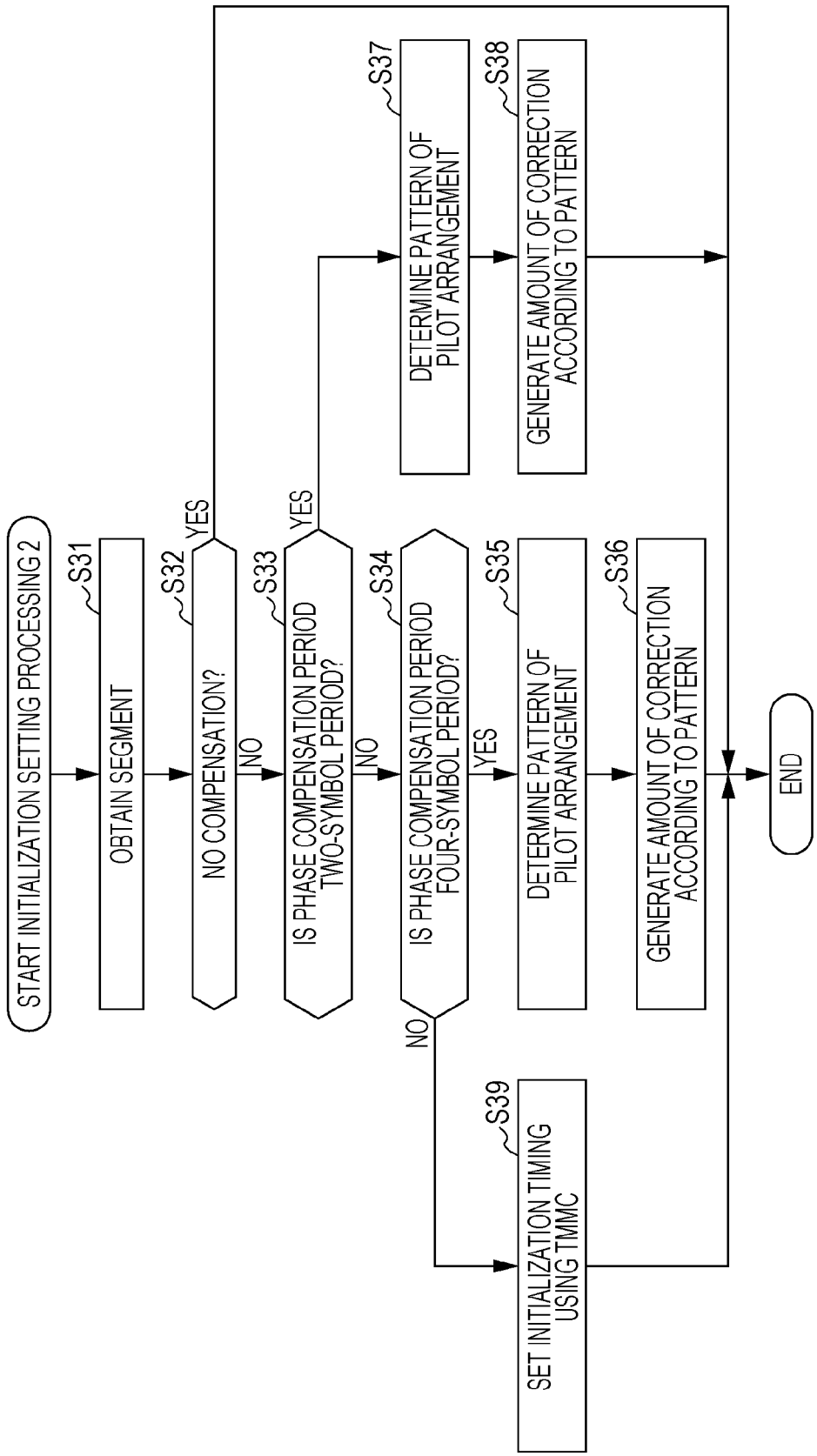
FIG. 11 is a flowchart for describing different processing by the setting unit.

Processing by the correction unit 200 illustrated in FIG. 10 is described referring to a flowchart in FIG. 11. In Step S31, the correction unit 200 obtains the segment. In Step S32, the correction phase generation unit 153 determines whether or not the phase compensation is present.

In Step S32, if it is determined that the obtained segment is the no-compensation segment, the processing associated with the initialization setting is terminated. On the other hand, in Step S32, if it determined that the obtained segment is not the no-correction segment, the processing proceeds to Step S33.

In Step S33, with the information on the parameters from the processing unit not illustrated, it is determined whether or not the period for the amount of the phase compensation amount is the two-symbol period.

In Step S33, if it is determined that the period for the amount of the phase compensation is not the two-symbol period, the processing proceeds to Step S34, and it is determined whether or not the period for the amount of the phase compensation is the four-symbol period. In Step S34, if it is determined that the period for the amount of the phase compensation is the four-symbol period, the processing proceeds to Step S35.

In Step S35, it is determined which pattern the pattern of the pilot arrangement is. A result of the determination is used, and in Step S36, the amount of the correction according to the pattern is generated. In this case, because the period for the amount of the phase compensation is the four-symbol period, as described above, the amount of the correction is generated that corresponds to the amount of the phase compensation that is available when the period for the amount of the phase compensation is the four-symbol period, and that corresponds to each segment. The rotation correction is performed by using the generated amount of correction.

On the other hand, in Steps S33, if it is determined that the period for the amount of the phase compensation is the two-symbol period, the processing proceeds to Step S37. In Step S37, it is determined which pattern the pattern of the pilot arrangement is. A result of the determination is used, and in Step S38, the amount of the correction according to the pattern is generated.

In this case, because the period for the amount of the phase compensation is the two-symbol period, the amount of the correction is generated that corresponds to the amount of the phase compensation that is available when the period for the amount of the phase compensation is the two-symbol period, and that corresponds to each segment. The rotation correction is performed by using the generated amount of correction.

On the other hand, in Step S34, if it is determined that the period for the amount of the phase compensation is not the four-symbol period, the processing proceeds to Step S39. If the processing proceeds to Step S39, this occurs when it is determined that the period for the amount of the phase compensation is the eight-symbol period. Consequently, in Step S39, the initialization timing is set by using the TMCC.

In this manner, the initialization timing is set. Consequently, when the period for the amount of the phase compensation is the two-symbol period or the four-symbol period, it is possible to more greatly shorten the time taken before setting the initialization timing than when the TMCC information is used.

Furthermore, in this case, the amount of the correction that corresponds to the amount of the phase compensation for the received segment can be generated immediately after the segment is received. Consequently, the rotation correction of the received segment can be started immediately after the segment is received, and furthermore, it is possible to advance the initialization (synchronization) timing.

According to the embodiment described above, because the case where the number of the patterns of the pilot arrangement is 4 is described as an example, if the period for the amount of the phase compensation is the eight-symbol period, the initialization timing is described as being determined from the TMCC information.

If the known signal is used in which the number of the patterns of the pilot arrangement is 8, a configuration is possible in which even though the period for the amount of the phase compensation is the eight-symbol period, it is determined which symbol within the eight-symbol period is processed. Consequently, a configuration is also possible in which the signal in which the patterns, the number of which is 8 or greater, are included is used as the known signal, and in which the processing is performed in the same manner as in the case of the four-symbol period or the two-symbol period that is described above.

In this manner, according to the present technology, the synchronization can be performed by using the known signal, and it is possible to shorten the time taken before the synchronization.

Recording Medium

A sequence of processing described above may be executed in hardware and may be executed in software. In a case where the sequence of processing is executed in software, a program making up the software is installed on a computer. The computers here include a computer that is built into dedicated hardware, a general-purpose personal computer that is capable of executing various functions by installing various programs, and the like.

FIG. 12 is a block diagram illustrating an example of a hardware configuration of the computer that executes the sequence of processing described above using the program. In the computer, a central processing unit (CPU) 301, a read only memory (ROM) 302, and a random access memory (RAM) 303 are connected to one another through a bus 304. An input and output interface 305 is additionally connected to the bus 304. An input unit 306, an output unit 307, a storage unit 308, a communication unit 309, and a drive 310 are connected to the input and output interface 305.

The input unit 306 is configured as a keyboard, a mouse, a microphone, or the like. The output unit 307 is configured as a display, a speaker, or the like. The storage unit 308 is configured as a hard disk, a non-volatile memory, or the like. The communication unit 309 is configured as a network interface, or the like. The drive 310 drives a removable medium 311, such as a magnetic disk, an optical disc, a magneto-optical disk, or a semiconductor memory.

In the computer with the configuration described above, the CPU 301 performs the sequence of processing described above, for example, by loading the program stored in the storage unit 308 onto the RAM 303 through the input and output interface 305 and the bus 304 in order to execute the program.

The program executed by the computer (CPU 301) can be recorded, for example, on the removable medium 311 such as a package medium and thus can be provided. Furthermore, the program can be provided over a cable or wireless transmission medium such as a local area network, the Internet, and digital satellite broadcasting.

In the computer, the program can be installed in the storage unit 308 through the input and output interface 305 by mounting the removable medium 311 onto the drive 310. Furthermore, the program can be received with the communication unit 309 over a cable or through a wireless transmission medium and be installed in the storage unit 308. In addition, the program can be installed in advance on the ROM 302 or in the storage unit 308.

Moreover, the program that is executed by the computer may be a program by which the processing is performed in time series in the order described in the present specification, or may be a program by which the processing is performed in parallel at a necessary timing, such as when a request to execute the processing is made.

Furthermore, in the present specification, a system refers to an entire system that is configured from multiple apparatuses.

Moreover, effects described in the present specification are for illustration and thus are not limited to this illustration, and other effects may be present.

Moreover, embodiments of the present technology are not limited to the embodiments described above and various modifications can be made within a scope without departing from the gist of the present technology.

Moreover, the present technology may be configured as follows.

(1) A reception apparatus including: a correction unit that corrects phase compensation for each one of multiple phase-compensated segments that are connected one after another, in which the correction unit includes a timing generation unit that, based on a phase of a known signal, generates a timing at which an amount of the phase compensation is initialized, an amount-of-correction generation unit that, based on the phase of the known signal, generates an amount of correction for correcting the amount of the phase compensation, and a phase correction unit that performs phase correction on the phase compensation using the amount of the correction that is generated by the amount-of-correction generation unit.

(2) The reception apparatus according to (1), in which the phase of the known signal has multiple patterns, and in which the timing generation unit generates the timing at which the initialization occurs when among the multiple patterns, a predetermined pattern is detected.

(3) The reception apparatus according to (2), in which the known signal is a pilot signal, and in which the pattern is categorized by a position in which a scattered pilot (SP) is arranged.

(4) The reception apparatus according to (2) or (3), in which the amount of the phase compensation is 0 for every predetermined period, and in which the timing generation unit detects the timing at which the amount of the phase compensation is 0, by detecting the predetermined pattern.

(5) The reception apparatus according to any one of (2) to (4), in which the predetermined period for the amount of the phase compensation varies with transmission parameters, and in which by detecting the predetermined pattern, the timing generation unit detects the timing at which the amount of the phase compensation is 0 with the predetermined period that is specified by the transmission parameters.

(6) The reception apparatus according to (5), in which the parameters are a mode and a guard interval ratio.

(7) The reception apparatus according to any one of (1) to (6), in which segments being connected one after another are the segments that are connected one after another in accordance with ISDB-Tmm or ISDB-Tsb specifications.

(8) The reception apparatus according to any one of (1) to (6), in which the segments being connected one after another are a type-B super segment in accordance with ISDB-Tmm or ISDB-Tsb specifications.

(9) A reception method for use in a reception apparatus including a correction unit that corrects phase compensation for each one of multiple phase-compensated segments that are connected one after another, the method including: enabling the correction unit to generate a timing at which an amount of the phase compensation is initialized, based on a phase of a known signal; enabling the correction unit to generate an amount of correction for correcting the amount of the phase compensation, based on the phase of the known signal; and enabling the correction unit to perform phase correction on the phase compensation using the generated amount of the correction.

(10) A computer-readable program for causing a computer, which controls a reception apparatus which includes a correction unit that corrects phase compensation for each one of multiple phase-compensated segments that are connected one after another, to enable the correction unit to execute processing including: generating a timing at which an amount of the phase compensation is initialized, based on a phase of a known signal; generating an amount of correction for correcting the amount of the phase compensation, based on the phase of the known signal; and performing phase correction on the phase compensation using the generated amount of the correction.

(11) A reception apparatus including: a correction unit that corrects phase compensation for each one of multiple phase-compensated segments that are connected one after another, in which the correction unit includes an amount-of-correction generation unit that, based on a phase of a known signal, generates an amount of correction for correcting an amount of the phase compensation, and a phase correction unit that performs phase correction on the phase compensation using the amount of the correction that is generated by the amount-of-correction generation unit.

(12) A reception method for use in a reception apparatus including a correction unit that corrects phase compensation for each one of multiple phase-compensated segments that are connected one after another, the method including: enabling the correction unit to generate an amount of correction for correcting an amount of the phase compensation, based on a phase of a known signal; and enabling the correction unit to perform phase correction on the phase compensation using the generated amount of the correction.

(13) A computer-readable program for causing a computer, which controls a reception apparatus which includes a correction unit that corrects phase compensation for each one of multiple phase-compensated segments that are connected one after another, to enable the correction unit to execute processing including: generating an amount of correction for correcting an amount of the phase compensation, based on a phase of a known signal; and performing phase correction on the phase compensation using the generated amount of the correction.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus comprising:
correction circuitry configured to correct a phase compensation for each one of multiple phase-compensated segments that are connected one after another without using transmission multiplexing configuration control (TMCC) information, wherein the correction includes:
timing generation circuitry configured to, based on a phase of a known signal, generate a timing signal indicating a point at which an amount of the phase compensation is initialized,
amount-of-correction generation circuitry configured to, based on the phase of the known signal and on the timing signal from the timing generation circuitry, generate an amount of correction for correcting the amount of the phase compensation, and
phase correction circuitry configured to perform phase correction on the phase compensation using the amount of the correction that is generated by the amount-of-correction generation circuitry;
wherein the segments being connected one after another are a type-B super segment in accordance with integrated services digital broadcasting for terrestrial multimedia broadcasting (ISDB-Tmm) or ISDB for terrestrial sound broadcasting (ISDB-Tsb) specifications.

2. The reception apparatus according to claim 1,
wherein the phase of the known signal has multiple patterns, and
wherein the timing generation circuitry is configured to generate the timing signal indicating the point at which the initialization occurs when among the multiple patterns, a predetermined pattern is detected.

3. The reception apparatus according to claim 2,
wherein the known signal is a pilot signal, and
wherein the pattern is categorized by a position in which a scattered pilot (SP) is arranged.

4. The reception apparatus according to claim 2,
wherein the amount of the phase compensation is 0 for every predetermined period, and
wherein the timing generation circuitry is configured to detect the timing at which the amount of the phase compensation is 0, by detecting the predetermined pattern.

5. The reception apparatus according to claim 2,
wherein the predetermined period for the amount of the phase compensation varies with transmission parameters, and
wherein by detecting the predetermined pattern, the timing generation circuitry detects the timing at which the amount of the phase compensation is 0 with the predetermined period that is specified by the transmission parameters.

6. The reception apparatus according to claim 5,
wherein the parameters are a mode and a guard interval ratio.

7. A reception method for use in a reception apparatus including correction circuitry that corrects phase compensation for each one of multiple phase-compensated segments that are connected one after another without using transmission multiplexing configuration control (TMCC) information, the method comprising:
enabling the correction circuitry to generate a timing signal indicating a point at which an amount of the phase compensation is initialized, based on a phase of a known signal;
enabling the correction circuitry to generate an amount of correction for correcting the amount of the phase compensation, based on the phase of the known signal and on the timing signal; and
enabling the correction circuitry to perform phase correction on the phase compensation using the generated amount of the correction;
wherein the segments being connected one after another are a type-B super segment in accordance with integrated services digital broadcasting for terrestrial multimedia broadcasting (ISDB-Tmm) or ISDB for terrestrial sound broadcasting (ISDB-Tsb) specifications.

8. A non-transitory computer-readable medium storing thereon instructions that, when executed by a processor of a computer, which controls a reception apparatus which includes correction circuitry that corrects phase compensation for each one of multiple phase-compensated segments that are connected one after another without using transmission multiplexing configuration control (TMCC) information, causes the correction-circuitry to execute processing comprising:
generating a timing signal indicating a point at which an amount of the phase compensation is initialized, based on a phase of a known signal;
generating an amount of correction for correcting the amount of the phase compensation, based on the phase of the known signal and on the timing signal; and
performing phase correction on the phase compensation using the generated amount of the correction;
wherein the segments being connected one after another are a type-B super segment in accordance with integrated services digital broadcasting for terrestrial multimedia broadcasting (ISDB-Tmm) or ISDB for terrestrial sound broadcasting (ISDB-Tsb) specifications.

9. A reception apparatus comprising:
correction circuitry configured to correct a phase compensation for each one of multiple phase-compensated segments that are connected one after another without using transmission multiplexing configuration control (TMCC) information,
wherein the correction circuitry includes:
amount-of-correction generation circuitry configured to, based on a phase of a known signal and on a timing signal indicating a point at which an amount of the phase compensation is initialized, generate an amount of correction for correcting an amount of the phase compensation, and
phase correction circuitry configured to perform phase correction on the phase compensation using the amount of the correction that is generated by the amount-of-correction generation circuitry;
wherein the segments being connected one after another are a type-B super segment in accordance with integrated services digital broadcasting for terrestrial multimedia broadcasting (ISDB-Tmm) or ISDB for terrestrial sound broadcasting (ISDB-Tsb) specifications.

10. A reception method for use in a reception apparatus including correction circuitry that corrects phase compensation for each one of multiple phase-compensated segments that are connected one after another without using transmission multiplexing configuration control (TMCC) information, the method comprising:
enabling the correction circuitry to generate an amount of correction for correcting an amount of the phase compensation, based on a phase of a known signal and on a timing signal indicating a point at which an amount of the phase compensation is initialized; and enabling the correction circuitry to perform phase correction on the phase compensation using the generated amount of the correction;

wherein the segments being connected one after another are a type-B super segment in accordance with integrated services digital broadcasting for terrestrial multimedia broadcasting (ISDB-Tmm) or ISDB for terrestrial sound broadcasting (ISDB-Tsb) specifications.

11. A non-transitory computer-readable medium storing thereon instructions that, when executed by a processor of a computer, which controls a reception apparatus which includes correction circuitry that corrects phase compensation for each one of multiple phase-compensated segments that are connected one after another without using transmission multiplexing configuration control (TMCC) information, causes the correction-circuitry to execute processing comprising:

generating an amount of correction for correcting an amount of the phase compensation, based on a phase of a known signal and on a timing signal indicating a point at which an amount of the phase compensation is initialized; and performing phase correction on the phase compensation using the generated amount of the correction;

wherein the segments being connected one after another are a type-B super segment in accordance with integrated services digital broadcasting for terrestrial multimedia broadcasting (ISDB-Tmm) or ISDB for terrestrial sound broadcasting (ISDB-Tsb) specifications.

* * * * *